United States Patent
Dodworth

(10) Patent No.: US 10,780,677 B2
(45) Date of Patent: Sep. 22, 2020

(54) COMPOSITE STRUCTURE EXHIBITING ENERGY ABSORPTION AND/OR INCLUDING A DEFECT FREE SURFACE

(71) Applicant: BRIGHT LITE STRUCTURES LLC, San Francisco, CA (US)

(72) Inventor: Antony Dodworth, Stamford (GB)

(73) Assignee: BRIGHT LITE STRUCTURES LLC, San Francisco, CA (US)

( * ) Notice: Subject to any disclaimer, the term of this patent is extended or adjusted under 35 U.S.C. 154(b) by 0 days.

(21) Appl. No.: 15/311,606

(22) PCT Filed: Jun. 3, 2015

(86) PCT No.: PCT/US2015/034072
§ 371 (c)(1),
(2) Date: Nov. 16, 2016

(87) PCT Pub. No.: WO2015/187879
PCT Pub. Date: Dec. 10, 2015

(65) Prior Publication Data
US 2017/0080675 A1  Mar. 23, 2017

Related U.S. Application Data

(60) Provisional application No. 62/007,614, filed on Jun. 4, 2014, provisional application No. 62/007,632, filed
(Continued)

(51) Int. Cl.
| | |
|---|---|
| *B32B 27/12* | (2006.01) |
| *B29D 24/00* | (2006.01) |
| *B32B 37/14* | (2006.01) |
| *B29C 44/12* | (2006.01) |
| *C08G 18/00* | (2006.01) |

(Continued)

(52) U.S. Cl.
CPC ............... *B32B 27/12* (2013.01); *B29B 7/88* (2013.01); *B29B 13/02* (2013.01); *B29C 43/203* (2013.01); *B29C 43/34* (2013.01); *B29C 43/56* (2013.01); *B29C 44/1209* (2013.01); *B29C 70/02* (2013.01); *B29C 70/305* (2013.01); *B29C 70/34* (2013.01); *B29C 70/345* (2013.01); *B29D 24/005* (2013.01); *B32B 3/12* (2013.01); *B32B 3/20* (2013.01); *B32B 5/02* (2013.01); *B32B 5/024* (2013.01); *B32B 5/18* (2013.01); *B32B 5/245* (2013.01); *B32B 27/065* (2013.01); *B32B 27/10* (2013.01); *B32B 27/20* (2013.01); *B32B 27/365* (2013.01); *B32B 27/38* (2013.01); *B32B 27/40* (2013.01); *B32B 37/146* (2013.01); *C08G 18/003* (2013.01); *B29C 44/1285* (2013.01); *B29C 67/205* (2013.01); *B29C 2043/561* (2013.01); *B29C 2043/568* (2013.01); *B29K 2023/06* (2013.01); *B29K 2063/00* (2013.01); *B29K 2069/00* (2013.01); *B29K 2075/00* (2013.01); *B29K 2105/04* (2013.01); *B29K 2105/041* (2013.01); *B29K 2105/0872* (2013.01); *B29K 2105/16* (2013.01); *B29K 2105/251* (2013.01); *B29K 2307/04* (2013.01); *B29K 2509/00* (2013.01); *B29L 2009/00* (2013.01); *B29L 2031/30* (2013.01); *B32B 2038/0024* (2013.01);
(Continued)

(58) Field of Classification Search
CPC ....... B29C 43/56; B29C 43/203; B29C 70/34; B29C 70/305; B29C 44/1209; B29C 70/345; B29C 70/02; B29C 43/34; B29C 2043/568; B29C 2043/561; B29C 67/205; B29C 44/1285; B32B 27/365; B32B 5/02; B32B 5/18; B32B 3/20; B32B 27/146; B32B 27/38; B32B 27/10; B32B 5/024; B32B 13/02; B32B 7/88; B32B 27/40; B32B 5/245; B32B 27/065; B32B 27/12; B32B 3/12; B32B 2605/00; B32B 2305/022; C08G 18/003; B29D 24/005; B29K 2105/251; B29K 2509/00; B29K 2307/04; B29K 2105/16; B29K 2105/04; B29K 2075/00; B29K 2063/00; B29K 2023/06; B29K 2105/0872; B29K 2069/00; B29L 2009/00

See application file for complete search history.

(56) References Cited

U.S. PATENT DOCUMENTS

| | | | |
|---|---|---|---|
| 2,882,673 | A | 4/1959 | Heinrich |
| 3,051,992 | A | 9/1962 | Bradley |

(Continued)

FOREIGN PATENT DOCUMENTS

| | | |
|---|---|---|
| CN | 201566184 U | 9/2010 |
| CN | 101946051 A | 1/2011 |

(Continued)

OTHER PUBLICATIONS

International Search Report and Written Opinion from International Application No. PCT/US2015/034070 dated Feb. 1, 2016.
(Continued)

*Primary Examiner* — Nathan M Nutter
(74) *Attorney, Agent, or Firm* — Dorsey & Whitney LLP

(57) ABSTRACT

Embodiments described herein relate to a composite structures or sandwiches that may have a relatively high bending stiffness and may have a relatively light weight as well as related methods of use and fabrication of the composite sandwiches. For example, a composite sandwich may include a core structure sandwiched between a two composite skins.

23 Claims, 9 Drawing Sheets

Related U.S. Application Data on Jun. 4, 2014, provisional application No. 62/007,652, filed on Jun. 4, 2014, provisional application No. 62/007,670, filed on Jun. 4, 2014, provisional application No. 62/007,685, filed on Jun. 4, 2014, provisional application No. 62/108,837, filed on Jan. 28, 2015.

(51) Int. Cl.

| | | |
|---|---|---|
| B29C 70/02 | (2006.01) | |
| B29C 70/34 | (2006.01) | |
| B32B 3/12 | (2006.01) | |
| B32B 27/36 | (2006.01) | |
| B29C 43/20 | (2006.01) | |
| B29C 43/34 | (2006.01) | |
| B29C 43/56 | (2006.01) | |
| B32B 3/20 | (2006.01) | |
| B32B 5/02 | (2006.01) | |
| B32B 5/18 | (2006.01) | |
| B29B 7/88 | (2006.01) | |
| B29B 13/02 | (2006.01) | |
| B29C 70/30 | (2006.01) | |
| B32B 27/10 | (2006.01) | |
| B32B 27/20 | (2006.01) | |
| B32B 27/38 | (2006.01) | |
| B32B 27/40 | (2006.01) | |
| B32B 5/24 | (2006.01) | |
| B32B 27/06 | (2006.01) | |
| B29C 67/20 | (2006.01) | |
| B29K 105/04 | (2006.01) | |
| B32B 38/00 | (2006.01) | |
| B29K 69/00 | (2006.01) | |
| B29K 105/08 | (2006.01) | |
| B29L 31/30 | (2006.01) | |
| B29K 105/00 | (2006.01) | |
| B29K 63/00 | (2006.01) | |
| B29K 75/00 | (2006.01) | |
| B29K 105/16 | (2006.01) | |
| B29K 307/04 | (2006.01) | |
| B29K 509/00 | (2006.01) | |
| B29L 9/00 | (2006.01) | |

(52) U.S. Cl.
CPC ... *B32B 2305/022* (2013.01); *B32B 2305/076* (2013.01); *B32B 2605/00* (2013.01)

(56) References Cited

U.S. PATENT DOCUMENTS

| | | | |
|---|---|---|---|
| 3,303,733 A | 2/1967 | Sheffield et al. | |
| 3,314,582 A | 4/1967 | Haigler | |
| 3,484,398 A | 12/1969 | Childs | |
| 3,906,137 A | 9/1975 | Bauer | |
| 4,543,289 A * | 9/1985 | Park | B32B 5/18 |
| | | | 428/304.4 |
| 4,687,691 A | 8/1987 | Kay et al. | |
| 4,940,563 A | 7/1990 | Kromrey | |
| 4,983,247 A | 1/1991 | Kim | |
| 5,034,256 A | 7/1991 | Santiso, III et al. | |
| 5,484,500 A | 1/1996 | Kaufmann et al. | |
| 5,540,870 A | 7/1996 | Quigley | |
| 5,645,926 A | 7/1997 | Horrocks et al. | |
| 5,683,782 A | 11/1997 | Duchene et al. | |
| 5,716,697 A | 2/1998 | Meeker | |
| 5,756,182 A | 5/1998 | Landi et al. | |
| 5,979,531 A | 11/1999 | Barr et al. | |
| 6,038,949 A | 3/2000 | Jander | |
| 6,139,942 A | 10/2000 | Hartness et al. | |
| 6,197,146 B1 | 3/2001 | Sucic et al. | |
| 8,028,736 B2 | 10/2011 | Jander | |
| 8,334,055 B2 | 12/2012 | Le Gall et al. | |
| 8,556,358 B2 | 10/2013 | Fitzgerald et al. | |
| RE44,893 E | 5/2014 | Raghavendran et al. | |
| 8,777,136 B2 | 7/2014 | Jander | |
| 2002/0010973 A1 | 1/2002 | Dumlao et al. | |
| 2002/0045696 A1 | 4/2002 | Sullivan et al. | |
| 2002/0106503 A1* | 8/2002 | Monk | B32B 3/26 |
| | | | 428/314.4 |
| 2002/0176979 A1 | 11/2002 | Evans | |
| 2003/0098520 A1 | 5/2003 | Cournoyer et al. | |
| 2003/0130411 A1 | 7/2003 | Ishikawa et al. | |
| 2003/0175455 A1 | 7/2003 | Erb et al. | |
| 2004/0028877 A1 | 2/2004 | Itoh et al. | |
| 2006/0048311 A1 | 3/2006 | Lee | |
| 2006/0065152 A1 | 3/2006 | Heitmeyer et al. | |
| 2006/0251902 A1 | 11/2006 | Botrie et al. | |
| 2007/0125042 A1 | 6/2007 | Hughes et al. | |
| 2007/0256379 A1* | 11/2007 | Edwards | B32B 5/18 |
| | | | 52/309.9 |
| 2008/0223857 A1 | 9/2008 | Palley et al. | |
| 2009/0227162 A1 | 9/2009 | Kruckenberg et al. | |
| 2010/0021718 A1 | 1/2010 | Vos et al. | |
| 2010/0255283 A1 | 10/2010 | Monk et al. | |
| 2010/0261000 A1* | 10/2010 | Jones | B29C 44/1228 |
| | | | 428/313.5 |
| 2011/0089183 A1 | 4/2011 | Gundelsheimer | |
| 2011/0143087 A1 | 6/2011 | Alberding et al. | |
| 2011/0180959 A1 | 7/2011 | Donnelly et al. | |
| 2011/0272509 A1 | 11/2011 | Jander | |
| 2012/0098300 A1 | 4/2012 | Murray | |
| 2012/0141765 A1 | 6/2012 | Katahira et al. | |
| 2012/0177874 A1 | 7/2012 | Brandon et al. | |
| 2012/0204741 A1 | 8/2012 | Bremmer et al. | |
| 2013/0101822 A1* | 4/2013 | Kunal et al. | B32B 3/26 |
| | | | 428/219 |
| 2013/0171381 A1 | 7/2013 | Grove-Nielsen | |
| 2013/0203878 A1 | 8/2013 | Igualada et al. | |
| 2013/0224410 A1 | 8/2013 | Nozawa | |
| 2013/0273308 A1 | 10/2013 | Day et al. | |
| 2013/0284003 A1 | 10/2013 | Dodworth | |
| 2013/0292076 A1 | 11/2013 | Raghavendran et al. | |
| 2013/0323429 A1 | 12/2013 | Strobel et al. | |
| 2014/0011016 A1 | 1/2014 | Vanimisetti et al. | |
| 2014/0145470 A1 | 5/2014 | Preisler et al. | |
| 2015/0166743 A1* | 6/2015 | Restuccia et al. | C08J 5/10 |
| | | | 428/327 |
| 2017/0057823 A1 | 3/2017 | Hart et al. | |
| 2017/0095997 A1 | 4/2017 | Dodworth | |
| 2017/0218141 A1 | 8/2017 | Nosker et al. | |
| 2017/0283571 A1* | 10/2017 | Taketa et al. | C08J 5/24 |

FOREIGN PATENT DOCUMENTS

| | | |
|---|---|---|
| CN | 201755923 U | 3/2011 |
| CN | 102227521 A | 10/2011 |
| CN | 102271888 A | 12/2011 |
| CN | 102548741 A | 7/2012 |
| CN | 203077713 U | 7/2013 |
| CN | 104254439 A | 12/2014 |
| DE | 102013225730 A1 | 6/2015 |
| EP | 0352993 A1 | 1/1990 |
| EP | 0478033 A1 | 4/1992 |
| EP | 0605235 A2 | 7/1994 |
| EP | 0628406 A2 | 12/1994 |
| EP | 0794051 A1 | 9/1997 |
| EP | 0798107 A2 | 10/1997 |
| FR | 2890893 A1 | 3/2007 |
| GB | 2101930 A | 1/1983 |
| GB | 2300380 A | 11/1996 |
| JP | YS40027900 | 9/1965 |
| JP | 51041764 A | 4/1976 |
| JP | S5334866 Y2 | 8/1978 |
| JP | S55-049251 A | 4/1980 |
| JP | S57113695 U | 7/1982 |
| JP | 01320145 A | 12/1989 |
| JP | 02088227 A | 3/1990 |
| JP | H03-099812 A | 4/1991 |

(56) References Cited

FOREIGN PATENT DOCUMENTS

| | | |
|---|---|---|
| JP | H03109145 A | 5/1991 |
| JP | H05132540 A | 5/1993 |
| JP | H06270304 A | 9/1994 |
| JP | 06344477 A | 12/1994 |
| JP | 07047626 A | 2/1995 |
| JP | H0718081 U | 3/1995 |
| JP | 07125118 A | 5/1995 |
| JP | H07180281 A | 7/1995 |
| JP | H07256803 A | 10/1995 |
| JP | 08258189 A | 10/1996 |
| JP | H11-25453 | 1/1999 |
| JP | 11207843 A | 8/1999 |
| JP | 11247356 A | 9/1999 |
| JP | H11254563 A | 9/1999 |
| JP | 2000006145 A | 1/2000 |
| JP | 2000043171 A | 2/2000 |
| JP | 2001031838 A | 2/2001 |
| JP | 2003025360 A | 1/2003 |
| JP | 2004017355 A | 1/2004 |
| JP | 2006188688 A | 7/2006 |
| JP | 2007331369 A | 12/2007 |
| JP | 2008230235 A | 10/2008 |
| JP | 2008238566 A | 10/2008 |
| JP | 2010149260 A | 7/2010 |
| JP | 2013001006 A | 1/2013 |
| JP | 2013032510 A | 2/2013 |
| JP | 2014533751 A | 12/2014 |
| WO | 90/00968 | 2/1990 |
| WO | 92/10362 | 6/1992 |
| WO | 92/12855 A | 8/1992 |
| WO | WO2003101719 A2 | 12/2003 |
| WO | 2009011304 A1 | 1/2009 |
| WO | 2009157295 A1 | 12/2009 |
| WO | 2013178755 A1 | 12/2013 |
| WO | 2014130751 A1 | 8/2014 |
| WO | 2017120025 A1 | 7/2017 |

OTHER PUBLICATIONS

Non-Final Office Action for U.S. Appl. No. 15/311,344 dated Jan. 11, 2018.
Restriction Requirement for U.S. Appl. No. 15/311,344 dated Oct. 20, 2017.
International Search Report and Written Opinion from International Application No. PCT/US2015/034051 dated Nov. 3, 2015.
International Search Report and Written Opinion from International Application No. PCT/US2015/034061 dated Aug. 19, 2015.
CompositesWorld, "High-tensile strength, high-modulus carbon fiber" Mar. 10, 2014 [online] [retrieved on Oct. 1, 2015). Retrieved from the Internet <URL: http://www.compositesworld.com/products/high-tensile-strength-high-modulus-carbon-fiber>.
International Search Report and Written Opinion from International Application No. PCT/US2015/034072 dated Nov. 2, 2015.
"Araldite FST 40002/40003 FST Composite System for Aerospace Interior," Huntsman Advanced Materials Flyer, 2014, pp. 1-2.
"Araldite FST 40004/40005 FST Composite System for Railway," Huntsman Advanced Materials Flyer, 2016, pp. 1-2.
"Araldite, Solutions or Automotive Mass Production," Huntsman Advanced Materials Flyer, 2014, pp. 1-2.
"Tough Sandwich Design Lightens Load Floor in Crossover SUV," Composites Technology, Jun. 1, 2008, Retrieved Nov. 22, 2016.
Bosch, Marcos Ramos, "New Sandwich Composites: For Lightweight Construction in the Automotive Industry," JEC Magazine #45, Nov.-Dec. 2008, Retrieved Nov. 22, 2016.
Non-Final Office Action for U.S. Appl. No. 15/311,703 dated Sep. 18, 2018.
Non-Final Office Action for U.S. Appl. No. 15/311,271 dated Nov. 19, 2018.
Notice of Allowance for U.S. Appl. No. 15/311,344 dated Jun. 20, 2018.
Notice of Allowance for U.S. Appl. No. 15/311,344 dated Sep. 28, 2018.
Restriction Requirement for U.S. Appl. No. 15/311,271 dated Aug. 28, 2018.
Restriction Requirement for U.S. Appl. No. 15/311,703 dated Jun. 27, 2018.
Notice of Allowance for U.S. Appl. No. 15/311,344 dated Jan. 15, 2019.
Notice of Allowance for U.S. Appl. No. 15/311,703 dated Mar. 5, 2019.
Restriction Requirement for U.S. Appl. No. 15/560,831 dated Apr. 2, 2019.
Issue Notification for U.S. Appl. No. 15/311,344 dated Aug. 14, 2019.
Issue Notification for U.S. Appl. No. 15/311,271 dated Aug. 21, 2019.
Non-Final Office Action for U.S. Appl. No. 15/311,703 dated Jun. 17, 2019.
Non-Final Office Action for U.S. Appl. No. 15/560,831 dated Aug. 29, 2019.
Notice of Allowance for U.S. Appl. No. 15/311,271 dated May 1, 2019.
Notice of Allowance for U.S. Appl. No. 15/311,344 dated Apr. 25, 2019.
U.S. Appl. No. 16/537,051, filed Aug. 9, 2019.
Notice of Allowance for U.S. Appl. No. 15/311,703 dated Oct. 23, 2019.
Advisory Action for U.S. Appl. No. 15/560,831 dated Apr. 6, 2020.
Final Office Action for U.S. Appl. No. 15/560,831 dated Feb. 4, 2020.
International Search Report and Written Opinion from International Application No. PCT/US2019/062138 dated Mar. 19, 2020.
International Search Report and Written Opinion from International Application No. PCT/US2019/062139 dated Mar. 19, 2020.
Notice of Allowance for U.S. Appl. No. 15/311,703 dated Feb. 5, 2020.
Non-Final Office Action for U.S. Appl. No. 15/560,831 dated May 29, 2020.
Notice of Allowance for U.S. Appl. No. 15/311,703 dated May 11, 2020.

* cited by examiner ial Application No. 62/007,614 filed on 4 Jun. 2014, the disclosure of which is incorporated herein, in its entirety, by this reference.

COMPOSITE STRUCTURE EXHIBITING ENERGY ABSORPTION AND/OR INCLUDING A DEFECT FREE SURFACE

CROSS-REFERENCE TO RELATED APPLICATIONS

This application claims priority to U.S. Provisional Application No. 62/007,614 filed on 4 Jun. 2014, the disclosure of which is incorporated herein, in its entirety, by this reference.

This application claims priority to U.S. Provisional Application No. 62/007,632 filed on 4 Jun. 2014, the disclosure of which is incorporated herein, in its entirety, by this reference.

This application claims priority to U.S. Provisional Application No. 62/007,652 filed on 4 Jun. 2014, the disclosure of which is incorporated herein, in its entirety, by this reference.

This application claims priority to U.S. Provisional Application No. 62/007,670 filed on 4 Jun. 2014, the disclosure of which is incorporated herein, in its entirety, by this reference.

This application claims priority to U.S. Provisional Application No. 62/007,685 filed on 4 Jun. 2014, the disclosure of which is incorporated herein, in its entirety, by this reference.

This application claims priority to U.S. Provisional Application No. 62/108,837 filed on 28 Jan. 2015, the disclosure of which is incorporated herein, in its entirety, by this reference.

BACKGROUND

Composite structures may be used in any number of suitable applications. Generally, composite structure also may be used in various applications where reducing weight to strength ratio is important. For example, composite structures may be used in vehicle chassis, panels for communication equipment, frames or body parts for transportation or vehicles (e.g., bicycles, motor cycles, trucks etc.), agricultural applications (e.g., agricultural equipment), energy related applications (e.g., wind power, solar), satellite applications, aerospace applications, construction materials (e.g., building materials and the like), and consumer products (e.g., furniture, toilet seats, and electronic products among others).

Accordingly, manufacturers and users of composite structures continue to seek improvements thereto.

SUMMARY

Embodiments described herein relate to composite structures (e.g., composite sandwiches) that may have a relatively high impact resistance and/or vibration dampening characteristic and may be relatively light weight as well as related methods of use and fabrication of the composite structures. For example, a composite sandwich may include a core structure sandwiched between at least two composite skins. In some embodiments, at least one of the at least two composite skins may include a polymer matrix (e.g., a solidified or cured polymer resin) and reinforcement fibers embedded in the polymer matrix. Generally, a cured or solidified polymer resin may be substantially completely cured or solidified or partially cured or solidified (e.g., such that the polymer resin remains at least partially viscous). Furthermore, after curing and solidifying, the polymer resin may form suitably strong bond with the core. In at least one embodiment, when solidified, the polymer resin provides structural rigidity and/or support for the composite sandwich.

An embodiment includes a multilayer composite skin that includes a composite skin including a plurality of fibers embedded in a polymer matrix, and a solid and substantially monolithic outer layer. The outer layer includes one or more polymer material. Moreover, the outer layer is bonded to the composite skin and includes an outer surface that is substantially free of defects.

At least one embodiment includes a composite sandwich. More specifically, the composite sandwich includes a first composite skin that includes a plurality of reinforcement fibers embedded in a polymer matrix. The composite sandwich also includes a second composite skin that includes a plurality of reinforcement fibers embedded in a polymer matrix. Moreover, the composite includes a core positioned between the first and second composite skins and bonded thereto. At least one of the first composite skin or the second composite skin is the multilayer composite skin according to any of the embodiments described herein.

One or more embodiments also include a fabrication method. In particular, the fabrication method includes positioning a powder on a molding surface of a first mold portion, and positioning a resin impregnated fiber sheet on the powder. The powder includes a plurality of granules of one or more of a thermoplastic material or thermoset material. The fabrication method also includes compressing and heating the powder together with the resin impregnated fiber sheet in the compression mold, thereby bonding together the plurality of granules to from a substantially solid and monolithic outer layer having an outer surface substantially free of defects.

An embodiment includes a multi-core composite sandwich includes a first composite skin including a plurality of fibers embedded in a polymer matrix and a second composite skin including a plurality of fibers embedded in a polymer matrix. The multi-core composite sandwich also includes a first core including a thermoplastic material and being positioned between the first composite skin and the second composite skin and bonded thereto. Moreover, the multi-core composite sandwich includes a third composite skin including a plurality of fibers embedded in a polymer matrix, and a second core positioned between the second composite skin and the third composite skin and bonded thereto.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
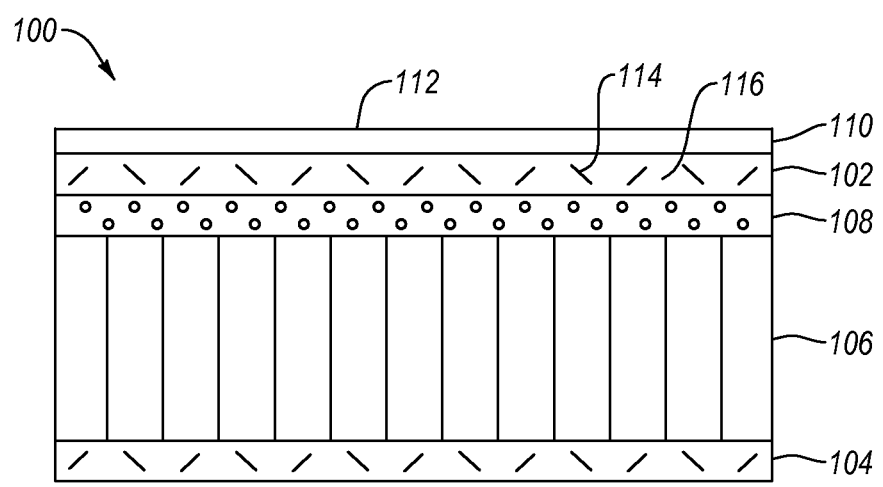
FIG. 1 is a partial cross-sectional view of a composite sandwich according to an embodiment.

Embodiments described herein relate to composite structures (e.g., composite sandwiches) that may have a relatively high impact resistance and/or vibration dampening characteristic and may be relatively light weight as well as related methods of use and fabrication of the composite structures. For example, a composite sandwich may include a core structure sandwiched between at least two composite skins. In some embodiments, at least one of the at least two composite skins may include a polymer matrix (e.g., a solidified or cured polymer resin) and reinforcement fibers embedded in the polymer matrix. Generally, a cured or solidified polymer resin may be substantially completely cured or solidified or partially cured or solidified (e.g., such that the polymer resin remains at least partially viscous). Furthermore, after curing and solidifying, the polymer resin may form suitably strong bond with the core. In at least one embodiment, when solidified, the polymer resin provides structural rigidity and/or support for the composite sandwich.

In one or more embodiments, a core blank may be at least partially compressed during fabrication to form the core of the composite sandwich. For example, a core blank may be positioned between fiber sheets impregnated with polymer resin, which may be heated and/or compressed together to form a composite sandwich. The fiber sheets together with polymer resin may form the composite skins of the composite sandwich, which are bonded to the core (formed from the core blank). In particular, for example, heating the polymer resin may harden or solidify the polymer resin to form the polymer matrix that bonds together the fibers of the fiber sheet of the resulting composite skin, which may be bonded to the core. In some embodiments, the core blank may be compressed to different heights or thicknesses to form a core that has correspondingly varied thicknesses at different portions thereof. Hence, in some embodiments, different portions of the composite sandwich may have different thicknesses (e.g., the composite sandwich and the composite skins thereof may have three-dimensional configurations). Moreover, the composite sandwich may be generally formed as a panel that may have planar and/or nonplanar surfaces.

The core material and configuration may vary from one embodiment to the next as well as from one portion of the composite sandwich to another. Generally, a relatively hard core may effectively transfer the full load from one end of the core to the other end of the core. For example, the "hard" core may be formed from a core blank that includes plastic material (e.g., thermoplastic, thermoset, combinations thereof, etc.) and may include multiple cells defined by corresponding one or more cell walls (e.g., the plastic material may define a honeycomb-like structure, where the cells may have any number of suitable shapes). In some embodiments, tubular members, such as plastic tubes (e.g., straws, such as drinking straws, which may include low cost material, and may be relatively light-weight) may be combined and/or bonded together to collectively form the core blank (e.g., each straw may define a corresponding cell of the core and adjacent cores may define additional cell in the gaps or spaces therebetween). Additionally or alternatively, high density foams and other suitable and/or compressible materials may be included the core blank (e.g., material that may be porous or may include small or micro pores or cells, which may have three-dimensional arrangement within the material).

In additional or alternative embodiments, one or more portions of the core may also be relative soft, and may include or may be constructed of relatively soft materials, such as paperboards or cardboards or low density foams. The "soft" core may not transfer a full load from one end of the core to the opposite end of the core when a load is applied onto an end of the core, for example, the "soft" core may be formed from paperboards, or cardboards and the like. In some embodiments, the full load means at least 70% of the load applied. In some embodiments, the full load means at least 80% of the load applied. In some embodiments, the full load means at least 90% of the load applied. In some embodiments, the full load means 100% of the load applied. The "soft" core may absorb more energy or impact than the "hard" core in a vertical direction substantially perpendicular to the composite skins (e.g., during an impact, the soft core may crumple and/or otherwise deform or fail in a manner that absorbs more of the impact energy than during a similar impact to the hard core).

As described above, the configuration and/or composition of the composite skins (e.g., the composition of the polymer matrix and/or reinforcement fiber) may vary from one embodiment to the next. Generally, the fibers may be continuous (e.g., fibers that may extend between edges of the skin) and/or discontinuous or short fibers. In some embodiments, the discontinuous fibers may be recycled fibers from waste fibers, such as from the RTM to significantly reduce the material cost. Also, the fibers may include any number of suitable materials (e.g., the fibers may be carbon fibers, glass fibers, etc.).

Moreover, the fibers (continuous and/or discontinuous) may be arranged together to define a fiber sheet. In some embodiments, the fibers in the fiber sheet may be overlaid one over another and/or weaved together. Alternatively, the fibers may be loosely positioned together and/or matted together to define the fiber sheet. In an embodiment, loosely positioned fibers may be attached or bonded together to form the fiber sheet.

In some embodiments, the composite sandwiches described herein may have a relatively high impact resistance and/or may have relatively good vibration and/or absorption and/or sound dampening through the composite sandwich (e.g., when the composite sandwich includes a relatively soft core). For example, such composite sandwiches may be used for fabricating or may be fabricated as any number of suitable components (e.g., automotive interior and/or exterior panels, such as a roof panel). As described above, the components fabricated from composite sandwich(es) may have two- and/or three-dimensional configurations.

In an embodiment, the composite sandwich may include a polymer surface that may be substantially free of surface defects (sometimes referred to as defect free surface or class A surface). For example, the low pressure compression molding process described herein may produce a polymer surface substantially free of pin holes and/or other defects (e.g., an outer surface of one or more of the skin layers of composite sandwich may be free of defects, such as pin holes). In some embodiments, a surface that is substantially free of defects may be easier and/or cheaper to paint (e.g., as compared to a surface with defects). Typically, RTM process may require application of high pressure, such as 120 bars (about 1764 psi), to reduce the sizes of pin holes on a finished composite surface, which may persist even when the processing is performed at high pressure. In some instances, the high pressure RTM process may be more expensive than low pressure compression molding and/or may have a lower yield than the low pressure compression molding process.

In some embodiments, the defect free or class A surface may have substantially no defects that may be noticeable during a visual inspection. For example, a small segment or portion of the surface may have no visually apparent or visible wave or roughness patterns. In an embodiment, a relatively large segment or portion of the surface may have no visually apparent or visible wave or roughness patterns (e.g., long waves or repeating patterns). For example, the class A surface may have a suitable curvature continuity, such that one or more regions (e.g., curved regions) are continuous to one another without visible connection or intersection therebetween. In some instances, painting a surface that includes pin holes may result in pain blisters and peel off. By contrast, a surface that is substantially free of pin holes may be painted, and the pain may remain on the surface without blistering or peeling off.

As mentioned above, generally, a core may be positioned between and bonded to opposing composite skins. In some embodiments, the core may include cardboard, paperboard, paper, foam, or similar material. In some embodiments, at least some of the material comprising the core may be at least partially permeable to the polymer resin of the composite skins. For example, during fabrication, the polymer resin of impregnated fiber sheets may contact and permeate into the material of a core blank used for forming the core, such that the composite skin formed from the impregnated fiber sheet is bonded to the core formed from the core blank. That is, in some embodiments, the polymer resin may at least partially impregnate the core blank and may, thereby, bond the core formed form the core blank to the composite skin that is formed from the impregnated fiber sheet that is pressed against the core blank. Additionally or alternatively, the core may include one or more thermoplastic and/or thermoset materials (e.g., walls defining cells in the core may include polycarbonate, polyethylene, etc.), as described in more detail in PCT International Application No. PCT/US15/34070, entitled "Composite Sandwich Having High Bending Stiffness" and is filed concurrently herewith, which claims priority to U.S. Provisional Application No. 62/007,614 filed on 4 Jun. 2014 and U.S. Provisional Application No. 62/108,837 filed on 28 Jan. 2015, the disclosure of each of the foregoing applications is incorporated herein in its entirety by this reference.

FIG. 1 illustrates a schematic side view of a composite sandwich 100 that has at least one outer surface free of surface defects in accordance with an embodiment. In particular, for example, the composite sandwich 100 may include first and second composite skins 102, 104 and a core 106 positioned therebetween and bonded thereto. The composite sandwich 100 also may include foam 108 (e.g., a polymer foam) between the first composite skin 102 and the core 106. In some embodiments, the foam 108 may form a layer that may be continuous or interrupted.

The first and second composite skins 102, 104 may include randomly oriented continuous and/or discontinuous fibers 114 embedded in a polymer matrix 116. As described above, the first and second composite skins 102, 104 may be fabricated by impregnating a fiber sheet with polymer resin and curing the polymer resin to form the polymer matrix 116, thereby embedding the fibers 114 therein. The fiber sheet, include continuous and/or discontinuous fibers arranged in a manner that forms a sheet or a panel. Alternatively, fibers loosely positioned near one another may be embedded in the polymer matrix 116. Moreover, the fibers may include any suitable reinforcement fiber, such as carbon fiber, glass fiber, combinations thereof, etc.

The polymer matrix 116 may be formed from a polymer resin, including a thermoset, a blend of a first thermoset and a second thermoset, a thermoplastic, or a blend of thermoplastics, a blend of a thermoplastic and a thermoset, and the like, as described in more detail in PCT International Patent Application No. PCT/US15/34051, entitled "Multicomponent Polymer Resin, Methods For Applying The Same, And Composite Laminate Structure Including The Same" and filed concurrently herewith, which claims priority to U.S. Patent Application No. 62/007,632 filed on 4 Jun. 2014 and U.S. Patent Application No. 62/108,837 filed on 28 Jan. 2015, the disclosure of each of which is incorporated herein, in its entirety, by this reference. For example, the polymer resin may be polyurethane, epoxy, or a mixture of polyurethane and epoxy. The polymer resin is in a liquid form before curing. In an embodiment, the polymer resin may bond to the fibers 116. The polymer resin may adhere to and/or bond to the core 106 (e.g., the polymer that forms the polymer matrix of the second composite skin 104 may bond to the core 106).

In some embodiments, the polymer matrix of the second composite skin 104 may be the same as or similar to the polymer matrix of the first composite skin 102. In some embodiments, the polymer matrix of the second composite skin 104 may be different from the polymer matrix of the first composite skin 102. Moreover, one or more portions of the first composite skin 102 may have the same or similar thickness as one or more portions of the second composite skin 104. Conversely, one or more portions of the first composite skin 102 may have different thickness than one or more portions of the second composite skin 104.

As described above, the core may include paperboard or other similar material that may absorb or may be permeable by polymer resin. In some embodiments, the foam 108 positioned between the first composite skin 102 and the core 106 may at least partially permeate the core 106 and/or bond thereto. In an embodiment, the foam 108 may bond to the first composite skin 102 (e.g., the polymer resin that forms the polymer matrix 116 of the first composite skin 102 may bond to the foam 108). Hence, for example, the foam 108 may bond the first composite skin 102 to the core 106. In some embodiments, the foam 108 may improve sound dampening and/or impact absorption characteristics of the composite sandwich 100 (e.g., as compared to a composite sandwich without the foam).

Generally, the core 106 may have any number of suitable configurations. In some embodiments, the core blank and the core 106 formed therefrom may include multiple cells, each having one or more walls define that define a cavity of the cell. As described above, for example, the walls that define the cells and cell cavities in the core may include or may be fabricated from any number of suitable materials, such as cardboard, paperboard, foam, etc. For example, the foam 108 may be bonded or adhered to the cardboard or paper core 106 and to the first composite skin 102, thereby attaching the first composite skin 102 to the core 106.

In one or more embodiments, the core 106 may include thermoplastic and/or thermoset polymers that define cells and corresponding cavities of the core 106 (e.g., bonded together tubular members may define the cells of the core 106). For example, the foam 108 may be located in and at least partially or completely fill cavities of one or more cells in the core 106. Moreover, as the foam 108 enters cavities in the core blank, the foam 108 may deform walls defining the cells in the core blank. For example, the core 106 may have deformed walls defining the cells therein. Alternatively or additionally, the foam 108 may be adhesively bonded to the core 106 (e.g., the material of the foam 108 may be in a an uncured or partially cured state during attachment to the core blank (that forms the core 106) and may adhere to the core blank, an adhesive may bond the foam 108 to the core 106, etc.).

In some embodiment, the foam 108 may eliminate or reduce indentations or dimples that may otherwise form in an outward facing surface of the first and/or second composite skins 102, 104. For example, as described above, the foam 108 may at least partially fill the cavities of the cell in the core 106, such as to prevent or limit the first composite skin 102 from entering one, some, or all of the cavities in the core 106.

In at least one embodiment, the composite sandwich 100 may include at least one outer surface that is substantially free of defects, such as porosity, pinholes, etc. In the illustrated embodiment, the composite sandwich 100 includes an outer layer 110 (e.g., a polymer layer), which may form or define an outer surface 112 of the composite sandwich. In an embodiment, the outer layer 110 may be attached or bonded to the first composite skin 102. Additionally or alternatively, the outer layer 110 may mask and/or fill any dimples in the outward facing surface of the first composite skin 102, such that the outer surface 112 generally has no dimples or depressions therein.

In one or more embodiments, the outer layer 110 may be fabricated from a layer or bed of thermoplastic and/or thermoset powder or pellets. For example, a layer of thermoplastic powder or pellets may be positioned in contact with and may be pressed against an impregnated fiber sheet to form respective first composite skin 102 and the outer layer 110. In at least one embodiment, the first composite skin 102 and the outer layer 110 may be boned together before bonding the composite skin 102 to the core blank that may form the core 106. For example, the foam 108 may bond the composite skin 102 together with the outer layer 110 to the core blank that forms the core 106. Additionally or alternatively, the polymer resin that at least partially forms the first composite skin 102 may be partially cured, such as to remain viscous, before bonding the first composite skin 102 to the core blank that forms the core 106.

Also, the composite sandwich 100 may include any number of additional or alternative layers that may be bonded to or integrated with the first and/or second composite skins 102, 104. For example, the composite sandwich may include multiple composite skins bonded together on one or more sides of the core 106 (e.g., another composite skin may be bonded to and/or integrated with the composite skin 102 and may form an outer surface of the composite sandwich 100, as described in more detail in PCT International Patent Application No. PCT/US15/34051, entitled "Multicomponent Polymer Resin, Methods For Applying The Same, And Composite Laminate Structure Including The Same" and filed concurrently herewith.

In some embodiments, the core 106 may include material that may have dampening properties and may dampen vibrations between the opposing first and second composite skins 102, 104. For example, the core 106 may dampen or impede vibrations therethrough resulting from sound waves impinging on the first or second composite skin 102, 104. More specifically, for example, a sound wave may transfer vibration from the surrounding medium to the first composite skin 102 that, in turn, may vibrate and transfer vibration the core 106. In an embodiment, the core 106 may dampen or reduce the amplitude of vibrations passing therethrough.

For example, as described above, the first and second composite skins 102, 104 may be bonded to the core 106. Hence, vibration may be transferred from the first composite skin 102, to the core 106, and to the second composite skin 104. In an embodiment, the core 106 may dampen the vibrations passing therethrough (e.g., by reducing amplitude thereof), such that the vibration transferred from the core 106 to the second composite skin 104 is dampened or has a lower amplitude than the vibration of the first composite skin 102.

For example, the core 106 may absorb the vibration energy transferred thereto from the first composite skin 102 and/or from the second composite skin 104. It should be appreciated that the core 106 may include or may be fabricated from any number of suitable vibration absorbing materials, such as porous absorbers, cell rubber foams or sponges, etc., which may absorb vibration through movement and friction within cell structures thereof. In any event, the core 106 may include suitable material for absorbing vibration, such as sound transmitted through the first and/or second composite skins 102, 104.

Generally, as noted above, the composite sandwich 100 may be formed as and/or incorporated into any number of suitable components (e.g., automotive components, such as panels and the like). In some embodiments, the composite sandwich 100 may be formed as a component intended to dampen or impede sound transmission from one side thereof to another. For example, the composite sandwich 100 may be formed as and/or incorporated into a vehicle panel (e.g., on the exterior and/or interior of the vehicle, to reduce sound or noise transmission into the interior of the vehicle).

As described above, the core 106 may include relatively hard material, such as thermoplastics (e.g., the core 106 may include tubular members made from a thermoplastic material, which may be bonded together). In an embodiment, the material of the core 106 may be impermeable to the resin or resin mixture or blend of the resin that forms the matrix of the first and/or second composite skins 102, 104. Moreover, in some embodiments, the resin the forms the first and/or second composite skins 102, 104 may foam (e.g., during fabrication), thereby forming foam or micro-foam the comprises the same or similar material as the matrix of the first and/or second composite skins 102, 104, as described in more detail in PCT International Application No. PCT/US15/34070, entitled "Composite Sandwich Having High Bending Stiffness" and is filed concurrently herewith. For example, the foam may extend into one, some, or each of the cavities of the core 106.

Figure 2:
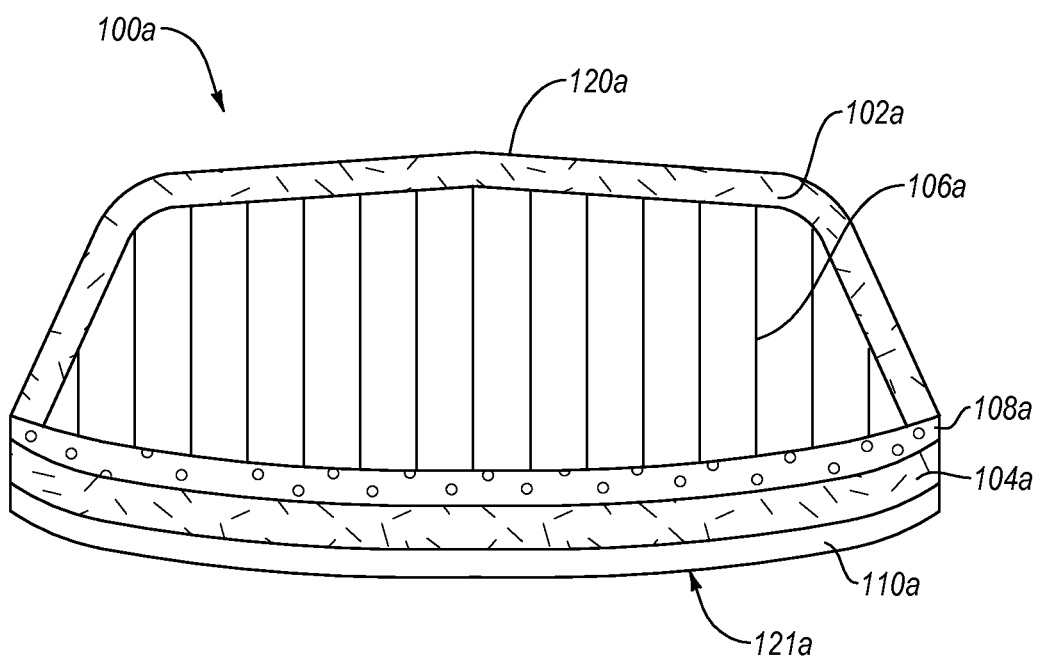
FIG. 2 is a partial cross-sectional view of a composite sandwich according to another embodiment.

In some embodiments, the outer surfaces of the composite sandwich 100 may be generally flat or planar (e.g., the outer surface 112 of the second composite skin 104 may be generally planar). Additionally or alternatively, one or more portions of at least one of the outer surface of the composite sandwich may be non-planar (e.g., may form a generally three-dimensional shape). FIG. 2 is a schematic illustration of a composite sandwich 100a that includes nonplanar outer surfaces, according to at least one embodiment. Except as otherwise described herein, the composite sandwich 100a and its elements and components may be similar to or the same as the composite sandwich 100 (FIG. 1) and its corresponding elements and components.

For example, the composite sandwich 100a may include first and second composite skins 102a, 104a and a core 106a bonded therebetween, which may be similar to the first and second composite skins 102, 104 and the core 106 of the composite sandwich 100 (FIG. 1). Moreover, the composite sandwich 100a may include foam 108a that may be positioned between the second composite skin and the core 106a. Additionally or alternatively, the composite sandwich may include an outer layer 110a that may be similar to or the same as the outer layer 110 (FIG. 1).

In an embodiment, a first outer surface 120a of the composite sandwich 100a (which may be defined by the first composite skin 102a) may be generally curved, such as to define a three-dimensional shape of the composite sandwich 100a. Additionally or alternatively, a second outer surface 121a of the composite sandwich 100a may be bent or curved. For example, the second outer surface 121a may have a different bend or curvature than the first outer surface 120a.

In some embodiments, the core 106a may have non-uniform thickness from one portion thereof to another (e.g., the distance between the first and second composite skins 102a, 104a may vary from one portion of the composite sandwich 100a to another portion thereof). As mentioned above, the core 106a may be relatively soft and may include cardboard and/or similar materials. Hence, in one or more embodiments, a core blank used in fabricating the composite sandwich 100a may be compressed to different heights between resin impregnated fiber sheets, to form the curved composite skins 102a, 104a and the core 106a that has corresponding curvature.

It should be appreciated that, under some processing conditions, bending and/or compressing a relatively soft core blank (e.g., core blank fabricated from cardboard) may damage and/or break one or more portions of the core blank, such as one or more walls defining the cells in the core blank. That is, in some locations, bending the impregnated fiber sheet together with the core blank may subject the core blank to sufficient stress to fail one or more portions of the core blank. In an embodiment, the core blank may be prefabricated to have varied thicknesses and/or approximate exterior shape of the finished core 106a, such that during fabrication of the composite sandwich 100a, the core blank is not compressed in a manner that may fail the walls of the cells in the core blank.

Moreover, in some embodiments, at the location(s) of higher stress, the core blank may include one or more materials with higher tensile strength than the tensile strength of other portion of the core blank (e.g., portions including cardboard). For example, such portions may include foam, thermoplastic material (e.g., forming walls of one or more cells), etc. Accordingly, the material at the portions of the core blank subjected to relatively higher loads (e.g., loads sufficient to fail the material at one or more other portions, such as cardboard) may withstand such higher loads without failure (e.g., by elastically and/or plastically deforming under the load).

As described above, a relatively soft core may provide or facilitate energy absorption by the composite sandwich (e.g., absorbing energy from impact, noise, etc.). In some embodiments, a relatively increased energy absorption provided by the relatively soft core may result in relatively lower stiffness of the composite sandwich. In alternative or additional embodiments, a composite sandwich may have relatively increase impact resistance and/or sound or noise dampening characteristic as well as suitable thickness. In some embodiments, at least one outer surface of the composite sandwich may be formed from a thermoplastic and/or may be substantially monolithic. For example, a substantially monolithic outer layer or skin, which may form the outer surface of the composite sandwich, may at least partially reflect sounds waves away from the outer surface thereof (e.g., sound waves propagating through the composite sandwich may be at least partially reflected by the outer layer toward the core and away from the outer surface of the composite sandwich).

Figure 3:
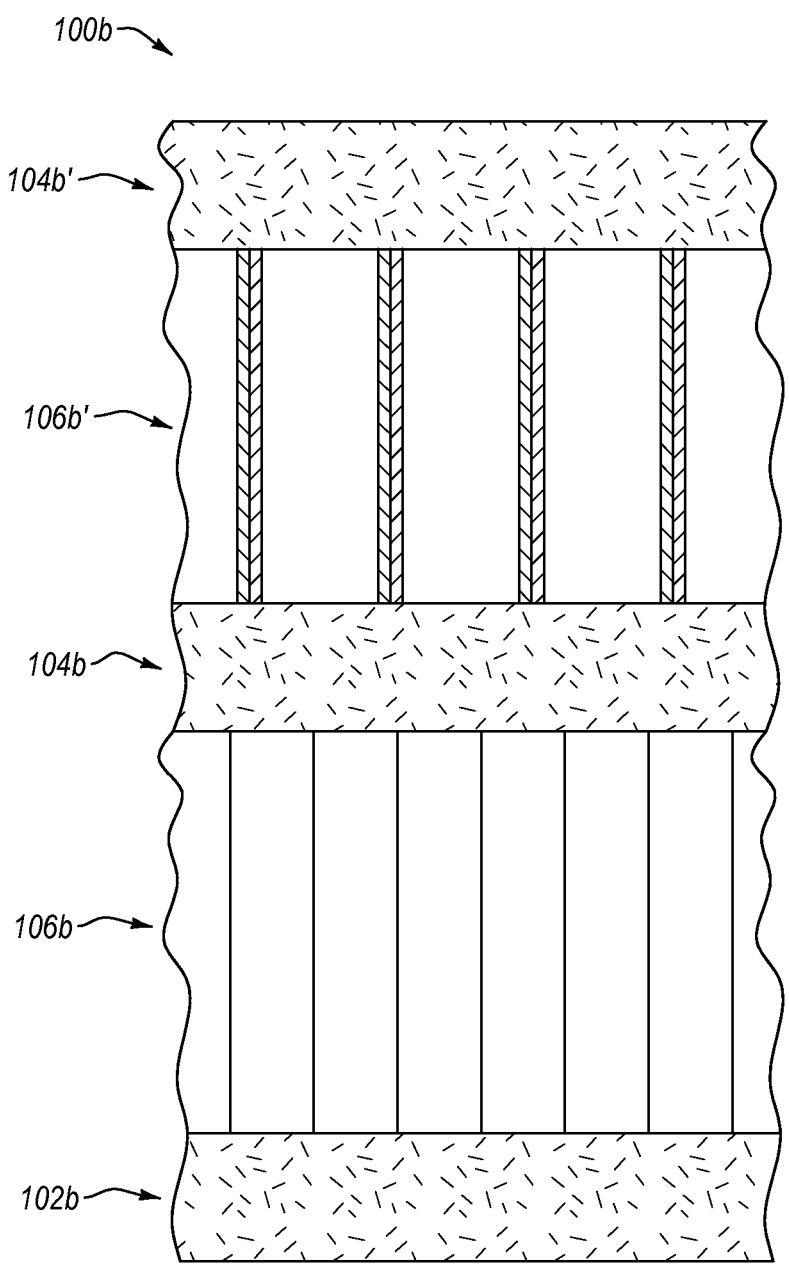
FIG. 3 is a partial cross-sectional view of a composite sandwich according to yet another embodiment.

FIG. 3 shows a multi-core composite sandwich 100b that may exhibit relatively improved impact and/or noise absorption (e.g., as compared with a composite sandwich including a relatively hard core) and a relatively improved stiffness (e.g., as compared with a composite sandwich that includes a relatively soft core, such as composite sandwiches 100, 100a (FIGS. 1-2)). Except as otherwise described herein, however, the multi-core composite sandwich 100b and its elements and components may be similar to or the same any of the composite sandwiches 100, 100a (FIGS. 1-2) and their corresponding elements and components.

In an embodiment, the multi-core composite sandwich 100b may include a first core 106b separated from a second core 106b' by an intermediate composite skin 104b. In particular, for example, the first core 106b may be bonded to the intermediate composite skin 104b on a first side thereof, and the second core 106b' may be bonded to the intermediate skin 104b on a second side thereof (e.g., opposite to the first core 106b). Moreover, the composite sandwich may include first and second outer composite skins 102b, 104b' to the respective first and second cores 106b, 106b'. More specifically, in an embodiment, the first core 106b may be bonded to and between the first outer composite skin 102b and intermediate composite skin 104b, and the second core 106b' may be bonded to and between the second outer composite skin 104' and the intermediate composite skin 104".

In an embodiment, outer surfaces of the first and second outer composite skins 102b, 104b' may define or form the outer surfaces and/or outer shape of the multi-core composite sandwich 100b. For example, the outer surfaces of the multi-composite sandwich 100b may be generally planar (e.g., the multi-core composite sandwich 100b may have a generally flat or planar outer surfaces, such that to form or define a generally flat or sheet-like shape of the multi-core composite sandwich 100b). Alternatively, one or more of the outer surfaces of the multi-core composite sandwich 100b may be generally non-planar (e.g., curved, bent, etc.), such as to form or define a three-dimensional shape of the multi-core composite sandwich 100*b*.

As described above, the multi-core composite sandwich 100*b* may be include one or more additional layers or materials bonded to the outer surfaces of the first and/or second composite skins 102*b*, 104*b'*, such as to define or form outer surface(s) of the multi-core composite sandwich 100*b* (e.g., the multi-core composite sandwich 100*b* may include one or more outer layers that may be similar to or the same as the outer layer 110 of the composite sandwich 100 (FIG. 1) that may have an outer surface that is substantially free of defects). Additionally or alternatively, the multi-core composite sandwich 100*b* may include one or more layers and/or materials positioned between the first core 106*b* and the first outer composite skin 102*b* and/or between the first core 106*b* and the intermediate skin 104*b*. For example, as described above, foam may be included between one or more of the composite skins and the first core 106*b* (e.g., foam may be positioned between the first outer composite skin 102*b* and the core 106*b*). Analogously, the multi-core composite sandwich 100*b* may include a one or more layers or materials positioned between the core 106*b'* and second outer composite skin 104*b'* and/or between the second core 106*b* and the intermediate composite skin 104*b'*.

In some embodiments, the first core 106*b* may have different stiffness, vibration absorption, impact resistance, or combinations thereof as compared to the second core 106*b'*. For example, the first core 106*b* may be generally softer and/or more compressible (e.g., without plastic deformation) than the second core 106*b'*. In an embodiment, material of the first core 106*b* may have better impact and/or vibration dampening or energy absorption characteristics than the second core 106*b'* (e.g., the first core 106*b* may have better sound absorption and/or noise reduction characteristics than the second core 106*b'*). Additionally or alternatively, the material of the second core 106*b'* may be stiffer and/or may have higher yield strength than the material of the first core 106*b*.

Generally, one or more portions or the entire first and/or second cores 106*b*, 106*b'* may be porous and/or may include cells that have cavities. Furthermore, for example, the first core 106*b* may include cardboard, paper, other cellulous materials, foam, sponge-like material, etc. In one or more embodiments, the second core 106*b'* may include thermoplastic and/or thermoset materials, such as polycarbonate, polyethylene, polypropylene, nylon, etc.

As described above, the first and second cores 106, 106*b* may include multiple cells having corresponding cavities defined by cell walls. In some embodiments, the shapes of the cells in the first core 106*b* may be similar to the shapes of the cells in the second core 106*b'*. Alternatively, at least some of the cells in the first core 106*b* may be different from at least some of the cells in the second core 106*b'*. In one or more embodiments, the first core 106*b* may include cells formed from corrugated sheets, overlapping sheets, interwoven sheets, combinations of the foregoing, etc., which may define polygonal shapes, circular shapes, etc. In an embodiment, at least some of the cells in the second core 106*b'* may have a first shape (e.g., circular), while other cells therein may have a second shape (e.g., diamond shaped, generally square, generally triangular, etc.), as described in more detail in PCT International Application No. PCT/US15/34070, entitled "Composite Sandwich Having High Bending Stiffness" and is filed concurrently herewith.

As mentioned above, the multi-core composite sandwich 100*b* may include any number of additional or alternative layers and/or material bonded and/or attached to the first and/or second outer skins 102*b*, 104*b'*. Moreover, in some embodiments, the fiber sheet(s) used to fabricate one or more of the composite skins may include a high performance material, such as a non-crimp fabric (NCF), a woven fabric, etc., which may increase resistance of the composite skin to pull out loads and/or tensile strength thereof, as described in more detail in PCT International Application No. PCT/US15/34070, entitled "Composite Sandwich Having High Bending Stiffness" and is filed concurrently herewith. For example, NCF may be embedded in a polymer matrix and may be bonded to the first and/or second outer skins 102*b'*, 104*b'*.

While in the illustrated embodiment the multi-core composite sandwich 100*b* includes two cores (the first and second cores 106*b*, 106*b'*), it should be appreciated that composite sandwich may include any suitable number of cores, which may vary from one embodiment to the next. Moreover, in some embodiments, adjacent cores may be positioned directly next to each other and/or bonded directly to each other, without an intermediate composite skin. It should be appreciated that the multi-core composite sandwich 100*b* may include any number of relatively soft and/or relatively hard cores, which may vary from one embodiment to the next. Also, any of the relatively hard and/or relatively soft cores may have any number of suitable configurations (e.g., may include cells that have any number of suitable shapes).

Furthermore, the multi-core composite sandwich 100*b* also may include one or more outer surfaces that are substantially free of pin holes and/or other defects (e.g., class A surfaces), as described above. Alternatively, one, some, or all of the outer surfaces of the multi-core composite sandwich 100*b* may include defects, such as pin holes. In some embodiments, an aesthetically appealing covering (e.g., carpeting) may conceal the surface(s) of the multi-core composite sandwich 100*b*, which include defects.

Figure 4:
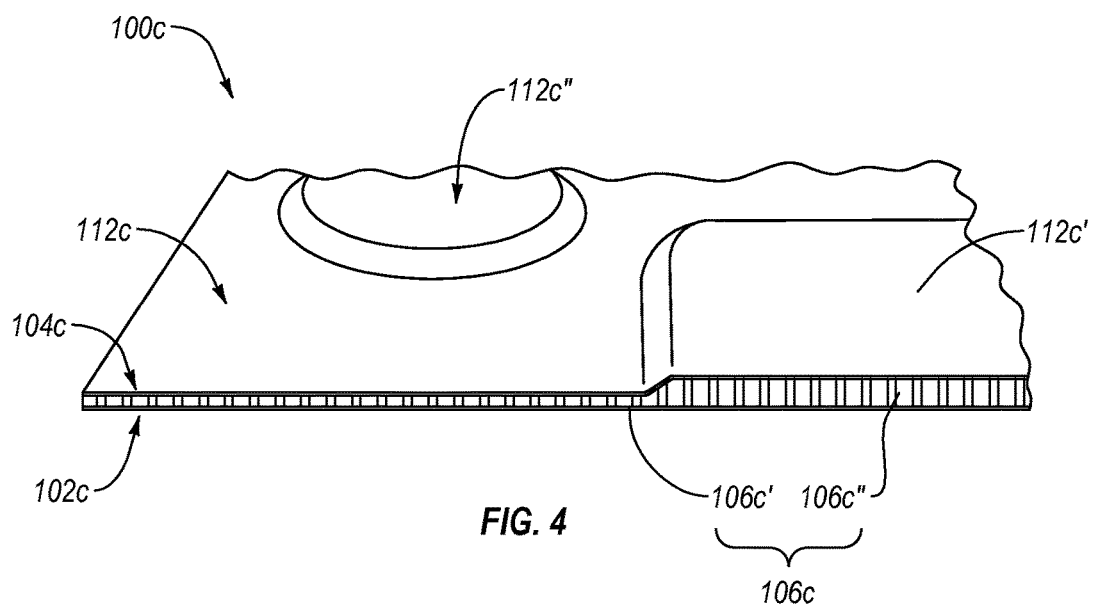
FIG. 4 is a partial cross-sectional view of a composite sandwich according to still one other embodiment.

FIG. 4 illustrates a composite sandwich 100*c* according to one or more embodiments. Except as otherwise described herein, the composite sandwich 100*c* and its elements and components may be similar to or the same as any of the composite sandwiches 100, 100*a*, 100*b* (FIGS. 1-3) and their corresponding elements and components. For example, the composite sandwich 100*c* may include first and second composite skins 102*c*, 104*c* and a core 106*c* positioned therebetween and bonded thereto.

As described above, one or more portions of the composite sandwich 100*c* may form or define a three-dimensional shape. For example, the composite sandwich 100*c* may include a first portion 112*c* (e.g., which may be generally planar), a second portion 112*c'* (e.g., which may be raised above the first portion 112*c* and may have a first shape), and a third portion 112*c"* (e.g., which may be raised above the first portion 112*c* and may have a second shape). In some embodiments, hence, the core 106*c* may have different thicknesses at the corresponding portions 112*c*, 112*c'*, 112*c"* of the composite sandwich 100*c*. For example, a first portion 106*c'* of the core 106*c* may have a first thickness (defined between the opposing first and second composite skins 102*c*, 104*c*), and a second portion 106*c"* may have a second thickness, which may be greater than the thickness of the first portion 106*c'*.

In at least one embodiment, a core blank used to form the core 106*c* may have different thicknesses at different portions thereof. Moreover, such thicknesses of the core blank may generally and/or proportionally correspond to the thicknesses of the core 106*c* formed therefrom (e.g., during fabrication, the core blank may be compressed by a small or insignificant amount to form the core 106c). Alternatively, to form the core 106c, the core blank may be compressed by any suitable amount, which may vary from one embodiment to the next and from one portion of the core blank to another. For example, the core blank may have a generally uniform thickness and, during fabrication, may be compressed to form the first and second portions 106c', 106c" of the core 106c, which may have different thicknesses.

Figure 5:
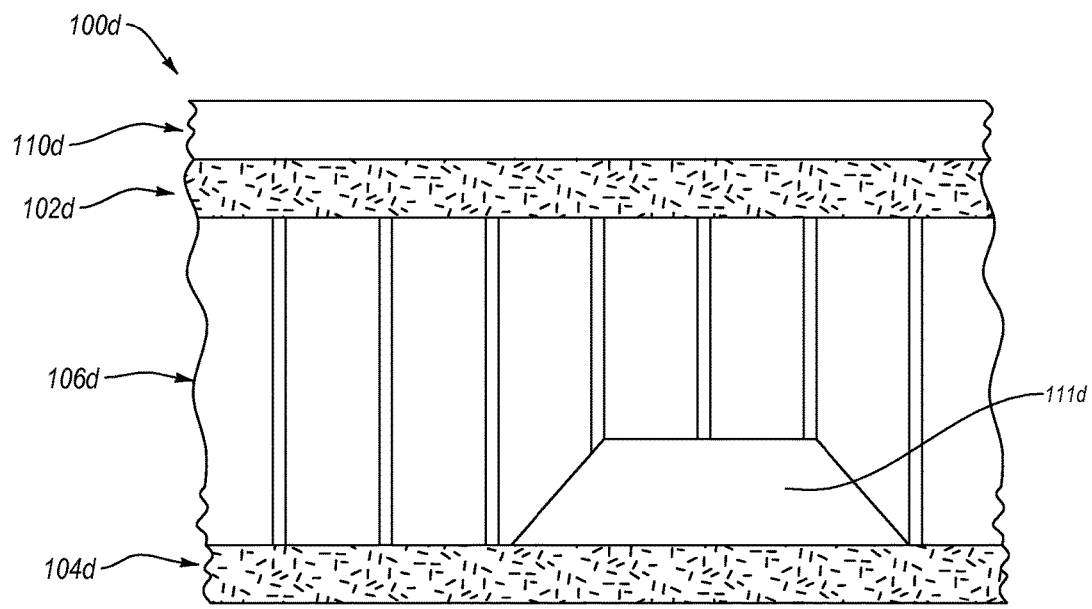
FIG. 5 is a partial cross-sectional view of a composite sandwich according to one or more embodiments.

FIG. 5 shows a schematic cross-sectional view of a composite sandwich 100d that includes and an insert 111k according to an embodiment. Except as otherwise described herein, the composite sandwich 100d and its elements and components may be similar to or the same as any of the composite sandwiches 100, 100a, 100b, 100c (FIGS. 1-4) and their corresponding elements and components. For example, the composite sandwich 100d may include bottom composite skin 104d bonded to a core 106d on a first side and a top composite skin 102d together with an outer layer 110d bonded to the core 106d on the second, opposing side thereof in a similar manner as in the composite sandwich 100 (FIG. 1).

In the illustrated embodiment, the composite sandwich 100d includes the insert 111d. Generally, the insert 111d may include or be formed from any suitable material, such as metal, plastic, glass, wood, among other suitable materials, as described in more detail in PCT International Application No. PCT/US15/34070, entitled "Composite Sandwich Having High Bending Stiffness" and is filed concurrently herewith. In some embodiments, the core 106d may be a relatively soft core (e.g., similar to or the same as core 106 of the composite sandwich 100 (FIG. 1)). Alternatively, the core 106 may be relatively a hard core.

In some embodiments, the core blank forming the core 106d may be compressed more at or near the portion containing the insert 111d than at one or more other portions. In some configurations, the core 106d may be formed from a core blank that is substantially uncompressed in some portions during fabrication. In at least one embodiment, the outer layer 110d of the composite sandwich 100d may include comprising NCF and/or other similar material. Additionally or alternatively, as described above, the outer layer 110d define or form an outer surface of the composite sandwich 100d, which may be substantially free of pinholes and/or other defects (e.g., the outer layer 110d may be fabricated from a powder, as described herein). It should be also appreciated that the insert 111d may be incorporated into any of the composite sandwiches described herein. Moreover, a multi-core sandwich may include one or more inserts that may be positioned in and/or may be at least partially surrounded by any of the cores (e.g., an insert may be positioned in and/or surround by a relatively hard core and/or by a relatively soft core).

Figure 6:
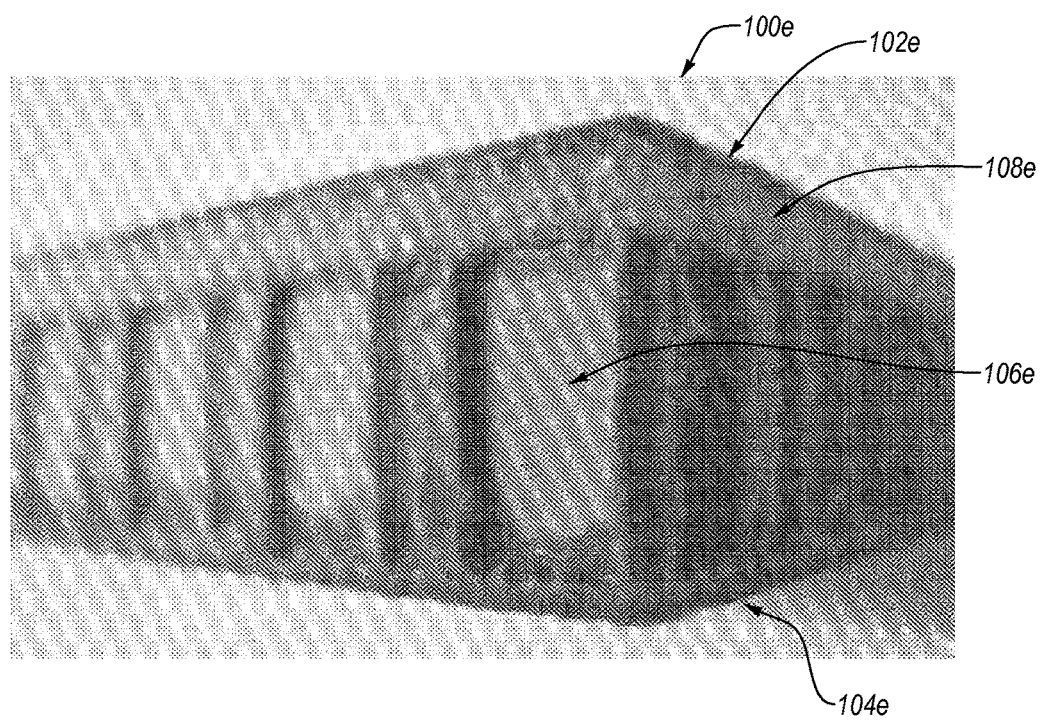
FIG. 6 is a photograph of a sample composite sandwich according to an embodiment.

FIG. 6 is a photograph showing a perspective side view of a sample composite sandwich 100e, according to an embodiment. Except as otherwise described herein, the composite sandwich 100e and its elements and components may be similar to or the same as any of the composite sandwiches 100, 100a, 100b, 100c, 100d (FIGS. 1-5) and their respective elements and components. For example, the sample composite sandwich 100d may include first composite skins 102e, 104e and a relatively soft core 106e positioned therebetween and bonded thereto, which may be similar to the composite sandwich 100 (FIG. 1). In at least one embodiment, the sample composite sandwich 100e may include foam 108e positioned between the first composite skin 102e and the core 106e and bonded thereto (e.g., the foam 108e may bond the composite skin 102e to the core 106e).

Figure 7A:
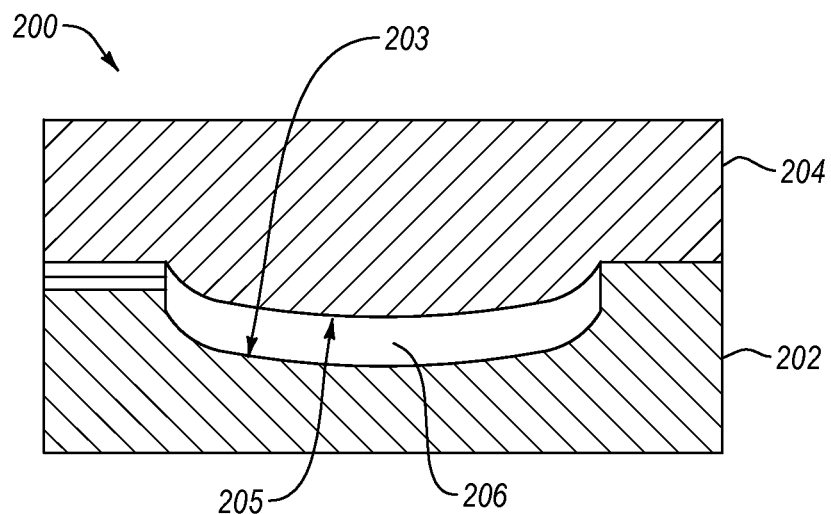
FIG. 7A is a schematic cross-sectional view of a compression mold according to an embodiment.

Any of the composite sandwiches described herein may be fabricated in a compression mold. FIG. 7A is a schematic illustration of a compression mold 200 that may be used in a first stage of the compression molding process for fabricating a composite sandwich according to an embodiment. The compression mold 200 may include a first mold portion 202 and a second mold portion 204. For example, the first mold portion 202 includes a molding surface 203, and the second mold portion 204 includes a molding surface 205. In an embodiment, the molding surface 203 may be curved (e.g., may be generally concave), and/or the opposing molding surface 205 may be curved in a complimentary manner (e.g., may be generally concave). It should be appreciated, however, that the size, shape (e.g., curvature), surface roughness and/or texture, of the molding surfaces 203, 205 may vary from one embodiment to another as may be suitable for a particular application.

In some embodiments, the compression mold 200 may include a mold cavity 206 defined by and/or between the molding surfaces 203, 205. There is an offset as shown by an arrow 316 between the first mold portion 302 and the first mold portion 304. In particular, as described below in more detail, a skin assembly (e.g., which may include a resin impregnated fiber sheet and thermoplastic and/or thermoset polymer pellets or powder) may be placed between the first and second mold portions 202, 204, such that when the compression mold 200 is closed, the skin assembly may be positioned and compressed inside the mold cavity 206.

Figure 7B:
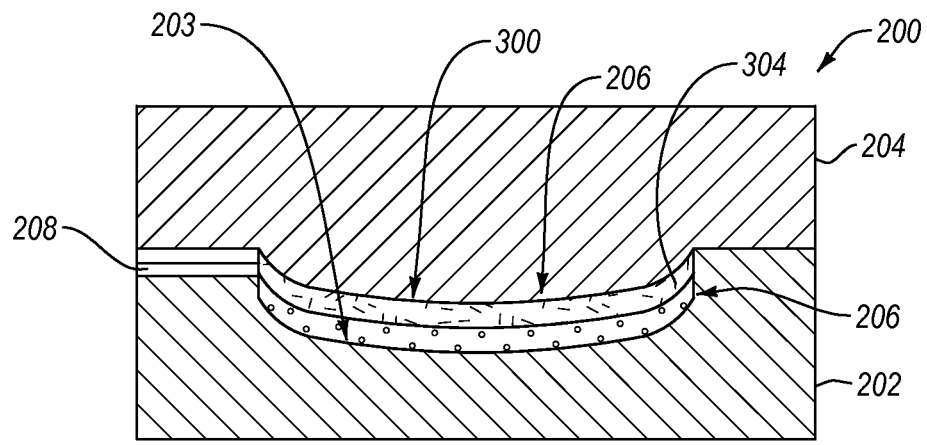
FIG. 7B is a schematic cross-sectional view of the compression mold of FIG. 7A with a skin assembly positioned therein.

FIG. 7B is a schematic illustration of a skin assembly 300 positioned inside the mold cavity 206 of the compression mold 200, according to an embodiment. In an embodiment, powder 302 may be placed on the molding surface 203 of the first mold portion 202, and a resin impregnated fiber sheet 304 may be placed onto the powder 302 (e.g., the powder 302 may be sprayed onto the molding surface 203 and/or may be uniformly positioned thereon). In some embodiments, when the compression mold 200 closes, the first and second mold portions 202, 204 compress the skin assembly 300 inside the mold cavity 206 of the compression mold 200 (e.g., before compression, the volume of the skin assembly 300 may be greater than the volume of the mold cavity 206). In an embodiment, air and/or other gases may be at least partially removed and/or vacuumed from the mold cavity 206 through an air outlet 208. For example, at least partially removing gas from the mold cavity 206 also may withdraw gas from the resin impregnated fiber sheet 304 (e.g., which may be in the resin impregnated fiber sheet 304 as air pockets or air bubbles).

Generally, the powder granules or pellets may vary in size and/or shape and may be suitably sized and/or shaped to facilitate removal of the air from the resin impregnated fiber sheet 304 (e.g., reducing granule size may decreases air flow between the granules, thereby impeding removal of air from the resin impregnated fiber sheet 304; conversely, increasing granule size may require an increase in thickness of the bed of powder and may increase the thickness of the outer layer formed therefrom). In some embodiments, the size of the powder granules may range from about 40 μm to 100 μm. It should be appreciated that the powder granules may be smaller than 40 μm or greater than 100 μm (e.g., the powder granules may be about 10 μm).

The powder may include a thermoset, such as epoxy, which may provide hardness to one or more outer surfaces of the composite sandwich. The powder may be a thermoplastic, such as polypropylene, polyethylene, nylon, polyester. The powder may also be a mix or blend of thermoset and thermoplastic powders. The thermoplastic or the blended powders may provide some toughness to the surface. The thermoset may be in a liquid form prior to curing and becomes solid after curing, which includes cross-linking of polymer chains. Additionally or alternatively, the thermoset may be adhesive. In some embodiments, the thermoplastic may be in the form of pellets, particles, granules, etc., and can be shaped into a final product by melting the granules and then molding. For example, processing or hardening of the thermoplastic may not involve curing or cross-linking The powder may have a relatively high glass transition temperature ($T_g$), such that the outer layer formed therefrom may withstand exposure to relatively high temperatures. Moreover, in some embodiments, the powder may have a higher $T_g$ temperature than the polymer used to form a matrix of the composite skin, such that the powder may remain in a solid or softened form for sufficient amount of time to facilitate removal of air from the stack assembly.

In some embodiments, a thermoset powder may include a hardener surrounded by a polymer resin shell, which may start to cure but be at least partially viscous during processing. The polymer resin shell may include epoxy and phenoxy, which may not require curing. In one or more embodiments, powder may become soft when heated and subsequently start curing or cross-linking to form a solid and/or monolithic outer layer (e.g., the thickness of the outer layer may depend on the thickness and/or amount of powder and, in some embodiments, may be at least about 100 µm).

In an embodiment, epoxy powders may be used in producing a pin hole free composite surface (e.g., in auto industry, sometime referred to an "A-class" surface). In some embodiments, epoxy powder may have a high Tg, such as an onset Tg of about 180° C. and may produce a shiny and/or paintable surface after processing. Moreover, some epoxy powders may start thermally degrading at about 200° C. or higher. The high Tg of an epoxy powder may help a composite sandwich to withstand high operating temperatures and/or high processing temperatures (e.g., e-coating of one or more surfaces of the composite sandwich, which may be performed at about 180° C., primer application process, other processes painting processes, etc.).

In at least one embodiment, the first mold portion 202 (e.g., at the molding surface 203) may be electrostatically charged, which may facilitate electrostatically attracting and/or retaining oppositely charged powder particles or granules on the molding surface 203 of the first mold portion 202. For example, charging the first mold portion 202 may facilitate reducing wasted powder and/or keeping the working space clean.

In some embodiments, the first and/or second mold portions 202, 204 may be heated, which may facilitate and/or accelerate curing of the resin impregnating the resin impregnated fiber sheet 304. Moreover, heating the compression mold 200 and the skin assembly 300 therein may also heat the powder 302, thereby melting and/or bonding the powder 302 to the resin impregnated fiber sheet 304. The resin may cure to form a polymer matrix and the fibers of the fiber sheet may be embedded in the polymer matrix. In at least one embodiment, the powder 302 may be cured to form a substantially solid and/or monolithic layer (e.g., such as the outer layer 110 of the composite sandwich 100 (FIG. 1). In any event, processing the powder 302 together with the resin impregnated fiber sheet 304 (as described herein) may produce a multilayer composite skin that includes an outer layer formed from powder (e.g., formed from powder particles bonded together into a monolithic layer), and a composite skin bonded to the outer layer (e.g., the composite skin may include a polymer matrix formed from the cured polymer resin and fibers embedded in the polymer matrix). In an embodiment, hardeners for the powder and polymer resin may be added to provide the same curing temperature for the powder and the polymer resin. In an embodiment, hardeners for the powder and polymer resin may be added to provide the different curing temperatures for the powder and the polymer resin.

Figure 8A:
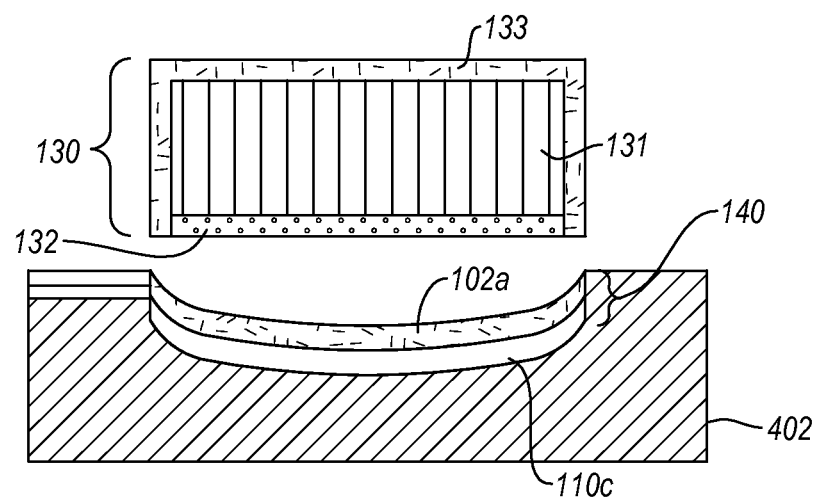
FIG. 8A is a schematic cross-sectional view of a portion of the compression mold with a skin assembly and a partial stack assembly according to an embodiment.

FIG. 8A schematically illustrates positioning of a partial stack assembly 130 onto a multilayer composite skin 140 according to an embodiment. For example, the multilayer composite skin 140 may be positioned on a molding surface, such as on a molding surface 403 of a first mold portion 402. In some embodiments, the multilayer composite skin 140 may be removed from the compression mold 200 (FIGS. 7A-7B) and may be placed in a compression mold 400 (FIG. 8B) that may include the first mold portion 402. The partial stack assembly 130 may be positioned onto the multilayer composite skin 140, while the multilayer composite skin remains on the molding surface of the first mold portion 402. In an embodiment, a portion of the partial stack assembly 130 also may be positioned on a molding surface of the first mold portion 402. Alternatively, the multilayer composite skin 140 may remain in the first mold portion used to form the multilayer composite skin 140 (e.g., in the first mold portion 202 (FIG. 7B)), and the partial stack assembly 130 may be positioned on or adjacent to the multilayer composite skin 140, while the multilayer composite skin remains on the molding surface of the first mold portion 202 (FIG. 7B).

In some embodiments, the mold cavity 406 may be bounded by the inner surface 420 of the upper mold portion 404, the inner surface 403 of the lower mold portion 402. In an embodiment, a height of the mold cavity between the upper mold portion 404 and the lower mold portion 402 may be smaller than the total thickness which includes the thickness of the stack assembly 130, such that when the mold 400 is closed, a pressure can be generated to compress the stack assembly 130.

In an embodiment, the first mold portion 202 of the mold 200 may be the generally same as and/or interchangeable with the first mold portion 402 of the second mold 400. In a parallel operation, the first mold 200 may perform the first molding operation that forms composite laminate with an outer surface generally free of surface defects or pin holes. Simultaneously, the second mold 400 may perform the second molding operation forming the composite sandwich. This parallel processing may reduce the production cycle time (e.g., as compared with sequential processing).

As described above, composite sandwich may vary from one embodiment to the next. Analogously, the partial stack assembly 130 may vary from one embodiment to the next. In some embodiment, the partial stack assembly 130 may include a core blank 131, a foam 132 positioned adjacent to and/or bonded or adhered to the core blank 131 on a first side thereof, and an impregnated fiber sheet 133 (e.g., impregnated with a polymer resin) positioned adjacent to or over the core blank 131. In some embodiments, the impregnated fiber sheet 133 may at least partially wrap about the core blank 131.

In an embodiment, the partial stack assembly 130 may be pressed against and/or bonded to (or together with) the multilayer composite skin 140. In some embodiments, before and/or during bonding of the multilayer composite skin 140 to the partial stack assembly 130, the at least a portion of the multilayer composite skin 140 may be at least partially viscous or uncured (e.g., the resin of the impregnated fiber sheet of the multilayer composite skin 140 may be at least partially uncured). Alternatively, the multilayer composite skin 140 may be fully cured or solidified.

Figure 8B:
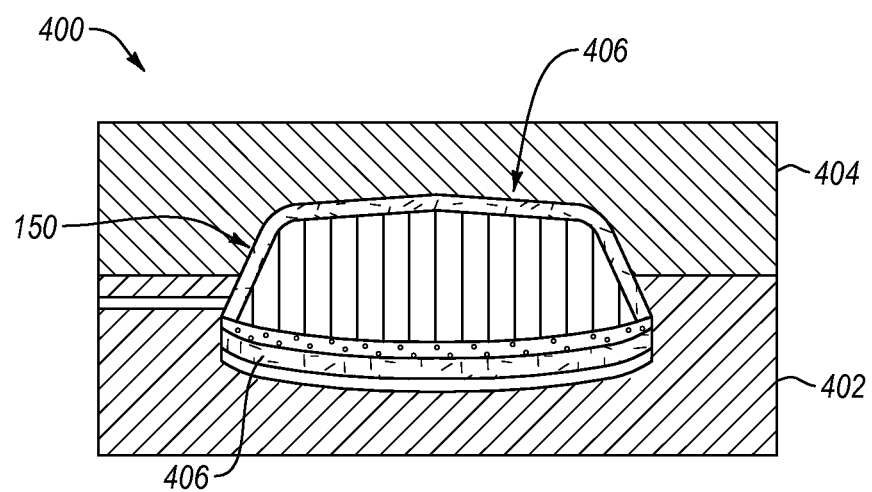
FIG. 8B is a schematic cross-sectional view of a compression mold including the mold portion of FIG. 8A and a stack assembly positioned in the compression mold according to an embodiment.

In an embodiment, the partial stack assembly 130 and the multilayer composite skin layer 140 may be pressed together and/or heated to form a composite sandwich (e.g., composite sandwich 100a (FIG. 2)). For example, as shown in FIG. 8B, after positioning or stacking together the multilayer composite skin 140 and the partial stack assembly 130, a second mold portion 404 of the compression mold 400 may be placed over a complete stack assembly 150 (formed from the partial stack assembly 130 and the multilayer composite skin 140). More specifically, the first and second mold portions 402, 404 may be closed together to form or define a mold cavity 406 within which the stack assembly 150 may be compressed and/or heated to form the composite sandwich.

As described above, the composite sandwich may have planar and/or nonplanar surfaces. The molding surfaces of the mold cavity 406 may be planar and/or nonplanar, as may be suitable for forming correspondingly shaped and/or configured composite sandwich. In the illustrated embodiment, the molding surfaces of the mold cavity 406 may be curved, such as to form a composite sandwich with correspondingly curved outer surfaces (e.g., the composite sandwich formed in the compression mold 400 may be similar to or the same as the composite sandwich 100a (FIG. 2)).

In any event, by compressing together and/or heating the various elements and components of the components of the combined composite assembly 150, a composite sandwich may be formed therefrom. In particular, for example, such composite sandwich may have an outer surface that may be substantially free of pinholes and/or other defects (e.g., the outer surface formed by the outer layer that was fabricated from powder). In some embodiments, the core blank (and corresponding core) may be formed from a relatively soft material (e.g., cardboard, foam, etc.). For example, forming or fabricating a composite sandwich that includes a relatively soft core and an outer layer formed from powder may involve a two stage process, as described above.

Alternatively, in one or more embodiments, the composite sandwich may be fabricated in a single stage process. For example, the core blank may include material having a suitable yield strength, such that powder may be compressed together with the core blank that may be arranged in a stack assembly described above (e.g., the stack assembly may include powder, impregnated fiber sheet, core blank, and a second impregnated fiber sheet sequentially arranged). As such, in some embodiments, a single compression mold may be used to fabricate a finished composite sandwich that includes an outer surface formed from powder (e.g., a composite sandwich that also includes a relatively hard core).

Figure 9:
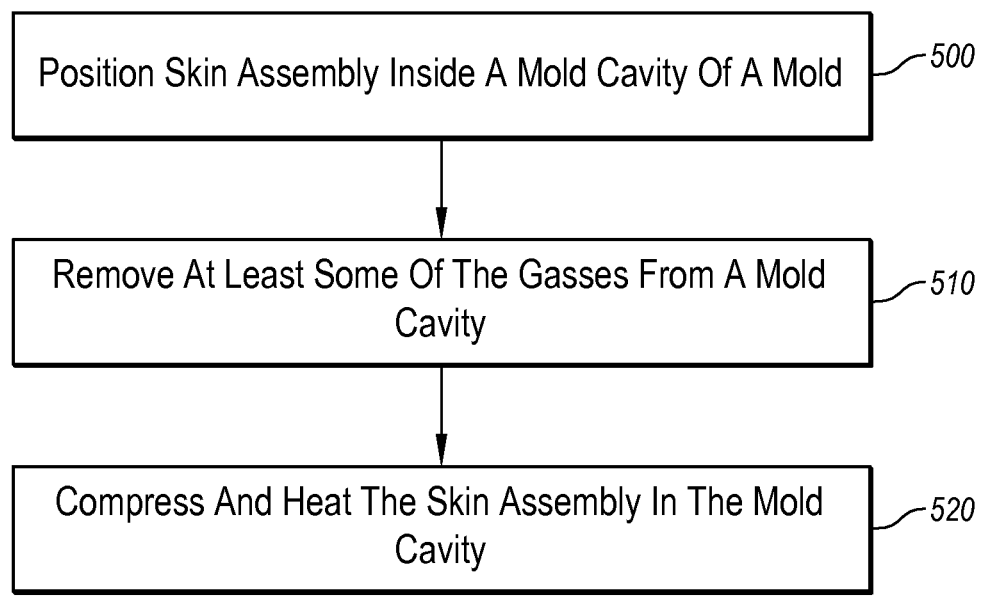
FIG. 9 is a flow chart for a method of fabricating a composite sandwich according to an embodiment.

FIG. 9 is a flow chart for a method of fabricating a composite sandwich according to an embodiment. For example, the method may include an act 500 of positioning a skin assembly inside a processing volume of a mold or mold cavity. In some embodiments, the stack assembly may be assembled inside the processing volume. As described above, the skin assembly may include any number of elements and components that, when processed in the mold, may form one or more composite skins and an outer layer bonded thereto. For example, the skin assembly may include one or more fiber sheets impregnated with a polymer resin and a thermoplastic and/or thermoset powder (e.g., a volume of powder) positioned adjacent to each other.

According to at least one embodiment, before the mold is closed to define the mold cavity, a polymer resin may be sprayed onto fiber sheet(s). To spray the resin, commercial spray heads may be used for high volume production of large parts. For the low pressure compression molding process, a hot pressure pot may be used for low volume production of small parts or prototypes instead of the commercial spray heads, which may reduce manufacturing cost. The low pressure hot pot is capable of spraying the resin.

The polymer resin may be polyurethane, epoxy, another suitable polymer resin, or a mixture of any of the foregoing. A low viscosity mixture may be easier to spray. For a polymer resin, the viscosity may be reduced by warming the resin in hot pressure pot and to delay the start of hardening until in the compression molding. The hardener for the polymer resin including the mixture may be selected such that the epoxy and the polyurethane have about the same or similar curing time. Facilitating the same or similar curing times may allow the two thermosets (e.g., epoxy and polyurethane) to complete curing together without lengthening the curing process due to one of the thermosets in the polymer resin. Additionally or alternatively, the resin or a mixture may be spread or poured onto the fiber sheet. In at least one embodiment, the fiber sheet may be dipped in or may pass through a flow of resin and/or mixture (e.g., polyurethane and epoxy mixture).

In some embodiments, the method also may include an act 510 of removing at least some of the gases from the processing volume of a mold cavity of the mold and from the fiber sheets. For example, as described above, a vacuum pump may evacuate the gases from the mold cavity, thereby producing a reduced pressure or at least partial vacuum therein. Additionally or alternatively, at least some of the gases may be removed or aspirated from the mold cavity and from the impregnated fiber sheets by closing the mold and compressing the skin assembly (e.g., the mold cavity may have one or more openings or vents that allow gases from the mold cavity and from the compressed impregnated fiber sheet to exit the mold cavity). Again, removing gases from the mold cavity, may remove gases from the skin assembly (e.g., may remove air bubbles or pockets from impregnated fiber sheet(s)) and/or may form composite skins with fewer voids or substantially free of voids.

The method may also include an act 520 of compressing and heating the skin assembly in the mold cavity. In particular, for example, as the skin assembly is heated and compressed, the polymer resin may cure and/or may bond the impregnated fiber sheet to the core blank. Furthermore, the powder pellets may bond together and to the impregnated fiber sheet to form a solid and/or generally monolithic outer layer that is bonded to the composite skin layer formed from the impregnated fiber sheet.

In some embodiments, a processing pressure applied to the skin assembly may range from 5 bars to 10 bars (e.g., about 6 bars (about 88 psi)), which may be significantly lower than the pressure of about 120 bars (1764 psi) typically used in a conventional RTM. It should be appreciated, however, that the processing pressure may be greater than 10 bars or lower than 5 bars. It should be also appreciated that the acts or steps described herein may be performed in any suitable order that may vary from one embodiment to the next.

In an embodiment, the second mold portion may be heated to a higher temperature than the first mold portion (e.g., which may contact the powder), such that the resin starts to gel from the second mold portion toward the first mold portion. Such heating may and gel process may drive gas trapped in the discontinuous fibers toward the powder that may be positioned between the fibers and the first mold portion. The gas may be further removed by passing in the gap between powder granules (e.g., by using a vacuum pump). The temperature differences between the first mold portion and second mold portion may help form the pin hole free or porosity free surface.

In an embodiment, the curing temperature for the polymer resin and the powders may be similar, close to about 130° C. For example, the first and/or second mold portions may be heated to 125° C. Additionally or alternatively, the first and second mold portions may be heated to different temperatures, such as the upper portion may be heater to 125° C., and the first mold portion may be heated to 135° C., or vice versa. In an embodiment, the first mold portion may be at 80° C., and the second mold portion may be at 130° C., or vice versa.

In some embodiments, the mold may also include a first insulation layer (not shown) above the upper mold portion and a second insulation layer (not shown) below the lower mold portion. By removing one of the insulation layers, the upper mold portion and the lower mold portion may have a temperature gradient, which may further help produce a surface substantially free of surface defects, such as pin-hole or porosity. One of the insulation layers may be removed, when only one heater is available to generate the temperature gradient. For example, the first insulation layer may maintain the upper mold portion with a higher temperature, while the second insulation layer may be removed to keep the lower mold portion at a lower temperature. In other embodiments, the lower mold portion may be heated to a first temperature by a first heater and the upper mold portion may be heated to a second temperature by a second heater.

In some embodiments, the polymer resin impregnating the fiber sheet may be a mixture of polyurethane and epoxy with a lower glass transition temperature than the powder. For example, the powder may have a glass transition temperature of about 180° C., and the epoxy in the polymer resin may have a glass transition temperature of about 168° C. When the first mold portion is at a relatively low temperature, the powder may be heated without hardening. For example, the powder may have a gel time of about 90 seconds, before the powder temperatures reaches about 130° C., which may allow gases or air trapped in the impregnated fiber sheet to be vacuumed and to obtain a better surface finish (e.g., the air may flow between uncured and/or unbonded powder pellets).

As described above, the mold may include first and second mold portions. In some embodiments, the first and second mold portions may have different temperatures. For example, the temperature difference between the first and second mold portions may be at most 50° C. When the temperature difference increases to about 50° C., the dimension difference due to different thermal expansion at different mold temperatures may be too large, such as to cause high local pressure(s) on the skin assembly when the mold is closed; this high local pressure may result in significant mold wear.

In some embodiments, the first and/or second mold portions may be shaken or vibrated (e.g., during processing of the skin assembly), which may facilitate air flow or circulation in the mold cavity. For example, shaking or vibrating the first and/or second mold portions may produce a more uniform heat and/or temperature distribution for the large in the mold cavity (as compared with the mold cavity that is not shaken or vibrated).

In some embodiments, epoxy (e.g., epoxy that impregnated the fiber sheet) may take about 6-7 minutes to cure about 98%. The composite skin (formed from the resin impregnated fiber sheet) may shrink about 2.5% to 3% during curing (as compared to the volume of the resin impregnated fiber sheet). In an embodiment, complete curing of the epoxy (e.g., in the impregnated fiber sheet and/or in the powder) may be facilitated by post-processing or post curing in an oven (e.g., after the skin assembly is processed in a compression mold). For example, the oven may be heated at a 2° C. ramp from room temperature to an elevated temperature. For example, the composite may be heated to about 180° C. and may be dwelled at about 180° C. for a period of time, such as an hour or longer, which may ensure a complete curing of the powder and/or the resin. In an embodiment, a partially processed multilayer composite skin (e.g., which may be formed by processing the skin assembly in the compression mold, as described herein), may exhibit no further shrinkage (after initial processing) during the post curing, such as during heating in an oven, but may exhibit no further shrinkage during a post processing such as e-coating. Under some processing conditions, slow warm up of the resin during post curing may reduce the occurrences of thermal shock. It should be appreciated that any number of composite parts may be placed in the oven and may be subjected to the post curing process simultaneously.

In some embodiments, when the powder material has a curing temperature that is the same as or similar to the curing temperature of the polymer resin impregnating the fiber sheet, the mold may be heated to an elevated temperature. Specifically, the mold may be heated to the curing temperature of the polymer resin and/or of the powder. Alternatively, if the powder material has a higher curing temperature than the polymer resin impregnating the fiber sheet, the mold may be heated to a first elevated temperature to cure the polymer resin, and then may be further heated to a second elevated temperature to cure the powder. In at least one embodiment, the polymer resin impregnating the fiber sheet may have a higher curing temperature than the powder material, and the mold may be heated to a first elevated temperature to cure the powder, and then may be further heated to a second elevated temperature to cure the polymer resin.

In some embodiments, the polymer resin may include a blend or mixture of a first thermoset with a high viscosity and a second thermoset with a low viscosity. The polymer resin also may include a mixture of a thermoset and a thermoplastic. For example, the thermoplastic may be commingled fibers. Generally, the thermoset may be in a liquid form prior to curing. For example, a polymer resin may be in a liquid form before curing and may have a low viscosity (e.g., as compared with an un-mixed or unblended polymer resin), such that the polymer resin can be sprayed with a low pressure, such as less than 90 psi, as described in more detail in PCT International Application No. PCT/US15/34051, entitled "Multicomponent Polymer Resin, Methods For Applying The Same, And Composite Laminate Structure Including The Same" and filed concurrently herewith.

In some embodiments, mold release agents, such as wax, silicone, etc., may be applied to one or more molding surfaces, to facilitate removal of the multilayer composite skin from the compression mold. In at least one embodiment, a silicone mold release may not be desirable, especially where the silicone mold release would contact a surface of the multilayer composite skin, which is intended to be painted after processing.

In some embodiments, processing the skin assembly may produce an outer layer that has an outer surface that is substantially free of pinholes or porosity. Additionally or alternatively, the outer surface of the outer layer may include a polymer with a high glass transition temperature such that the surface can withstand high temperatures for the post processing. In some embodiments, the outer layer may be subjected to temperatures of at least at about 180° C.

Figure 10:
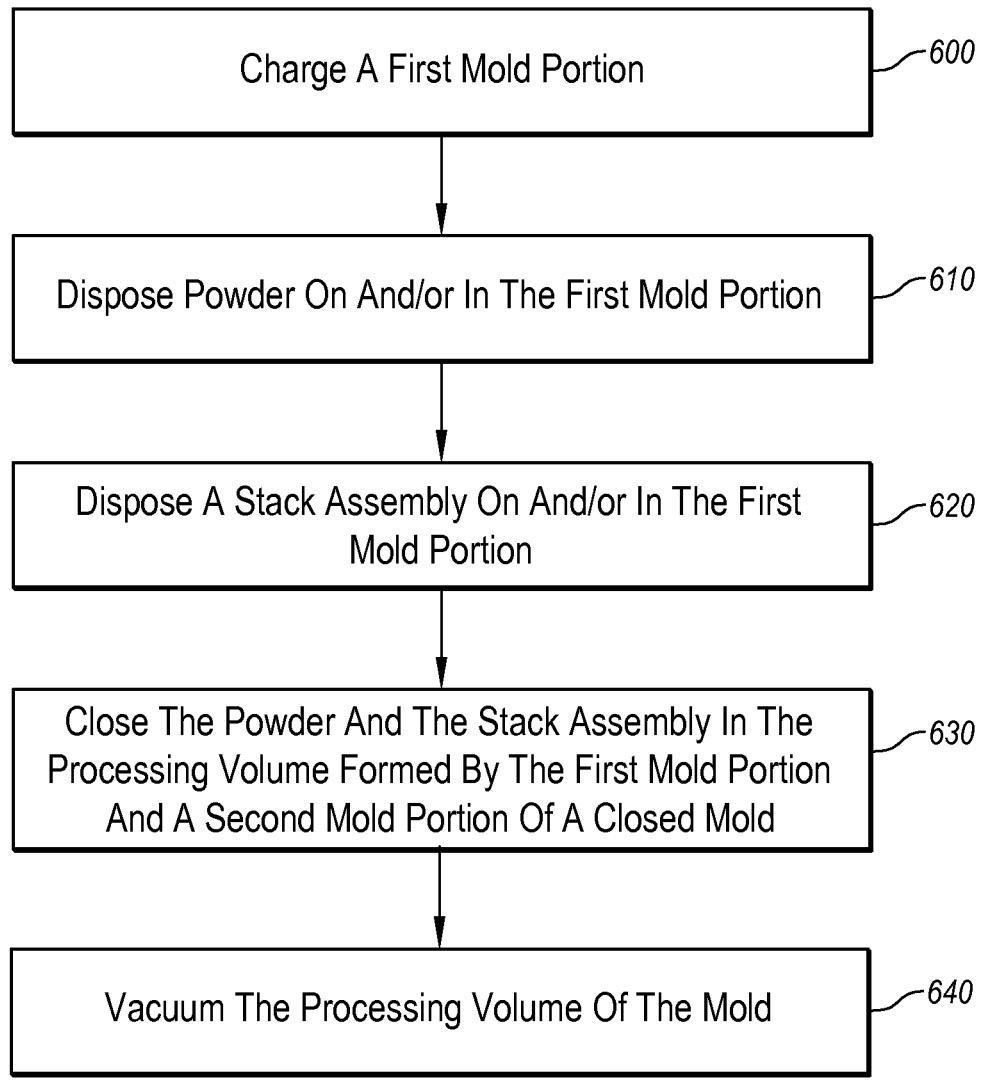
FIG. 10 is a flow chart for a method of fabricating a composite sandwich according to another embodiment.

FIG. 10 is a flow chart for a method for fabricating a composite sandwich according to one or more embodiments (e.g., which may be used to fabricate composite sandwiches described herein). In some embodiments, the method may include an act 600 of electrostatically charging a first mold portion. For example, the first mold portion may be charged to help retain a charged thermoplastic and/or thermoset powder therein. The electrostatic charging also may help to reduce the waste of powders and/or may keep work space surrounding the mold generally free of powder.

In an embodiment, the method may include an act 610 of placing or disposing one or more powders (e.g., thermoplastic and/or thermoset powders, as described above) on and/or in the first mold portion. For example, a powder spray gun may spray the powder(s) onto and/or into the first mold portion. Moreover, in some embodiments, the powder(s) may be spread generally uniformly on and/or over one or more surfaces of the first mold portion. By applying the powders to a mold surface, the air trapped in the fibers may be pulled out through the gap between the fiber layer and the tool surface and through the gaps or spaces between individual granules or particles of the powder(s). The powder(s) also may facilitate forming an outer surface of the composite sandwich substantially without pin holes. In some embodiments, the outer surface formed from the compressed and/or melted or cured powder also may be substantially watertight or waterproof.

Generally, the granules or particles of the powder(s) may vary in size and/or shape. In some embodiments, the granules or particles may be sized and/or shaped to allow the air trapped in the discontinuous fibers to be effectively removed by vacuum or by allowing the air to aspirate or exhaust out of the mold cavity (e.g., by passing in the spaces between granules). In some configurations, continuous fibers may be less likely to trap air than discontinuous fibers. In at least one embodiment, air may be effectively removed out of the waste fibers recycled from RTM. The amount of powder used may vary from one embodiment to the next and, among other things, may depend on the size and/or shape of the granules of the powder(s).

The method also may include an act 620 of disposing at least a partial stack assembly on and/or in the first mold portion. As described above, for example, a composite sandwich may be fabricated in two stages. In some embodiments, in a first stage of fabrication, a multilayer composite skin may be formed by processing thermoplastic and/or thermoset powder and a resin impregnated fiber sheet. In particular, the thermoplastic and/or thermoset powder and a resin impregnated fiber sheet may be compressed together and/or heated to form a multilayer composite skin that may include a composite skin (formed from the impregnated resin sheet) and an outer layer that may have an outer surface that is substantially free of pinholes and/or other defects (which is formed from the powder that may be bonded together during fabrication). For example, when a stack assembly includes a relatively soft or low yield strength core blank (e.g., such that compressing the powder together with the core blank may damage the core blank), the powder together with the impregnated fiber sheet may be processed separately from the core blank in the first stage of fabrication to produce a composite laminate with a surface generally free of pin holes or surface defects (e.g. A-class surface finish). Hence, in some embodiments, after forming the multilayer composite skin, in a second stage of fabrication, the multilayer composite skin may be attached or bonded to a partial stack assembly, that includes a core blank and another impregnated fiber sheet positioned in contact with the core blank (as described above). Alternatively, the partial stack assembly may also include the foam on the top of the core blank.

Alternatively, a complete stack assembly may be positioned directly on and/or in contact with powder, such that the core blank may be compressed together with the powder. For example, as described above, the core blank (and the core formed therefrom) may be relatively hard (e.g., core blank formed from polycarbonate, such as a core blank formed from polycarbonate tubes). Under some processing conditions, the relatively hard core blank may have sufficient or suitable yield strength to withstand the pressure suitable for compressing the powder during processing (e.g., to form a solid and/or substantially monolithic outer layer). Hence, in an embodiment, the stack assembly may include a first fiber sheet impregnated with a polymer resin (e.g., the first fiber sheet with polymer resin may be placed on the powder), a core blank, and a second fiber sheet impregnated with polymer resin positioned on the core blank, such that the core blank is positioned between the first and second impregnated fiber sheets, which may be processed together with the powder in a single stage fabrication.

The method may include an act 630 of closing the powder and the stack assembly in a processing volume of the mold formed by the first portion and a second portion of the closed mold. Moreover, the first and second portions of the mold may apply a selected pressure onto the powder and the stack assembly. In some embodiments, the method may include an act 640 of vacuuming the processing volume of the mold. Additionally or alternatively, as described above, gases may be removed from the mold cavity or processing volume of the mold during closing of the mold and/or compression of the stack assembly together with powder, by allowing the gas to escape through one or more openings or vents in the cavity.

In an embodiment, the method may include an act 650 of heating the powder and/or the stack assembly by heating the first and second mold portions. The second mold portion may be heated to a higher temperature than the first mold portion, such that the polymer resin starts to gel from the second mold portion toward the first mold portion, or vice versa. This gel process may urge air trapped in the discontinuous fibers toward gaps between granules or pellets of the powder(s), such that the air may be removed by the vacuum. In some embodiments, the temperature difference between the first and second mold portions may be at least 5° C. For example, the temperature difference between the first and second mold portions may be at least 10° C., at least 15° C., etc.

In an embodiment, the curing temperature for the polymer resin used in the stack assembly may be about 120° C. For example, the first mold portion may be at 115° C., and the second mold portion may be at 125° C. Alternatively, for example, the curing temperature may be about 125° C., and the first mold portion may be at 120° C., while the second mold portion may be at 130° C. Generally, the cure time may vary from one embodiment to another. In at least one embodiment, the curing of the epoxy may take about 6-7 minutes for about 98% cured. When cured, the polymer resin may shrink about 2.5 to 3% (e.g., as compared with full volume of uncured polymer resin).

In some embodiments, for complete curing, the composite sandwich may be subjected to a post curing processing (e.g., heated in an oven or autoclave). For example, the oven may be heated at a 2° C. ramp from room temperature to an elevated temperature, which may be encountered during a post processing, such as e-coating. In an embodiment, the composite sandwich may be heated to about 180° C. and may be held for a period of time at the temperature (e.g., for one hour), which may facilitate or ensure a complete curing and may reduce or eliminate further shrinkage. The slow warm up during the post curing may reduce the possibility and/or effects of a thermal shock. To improve the efficiency of the utilization of the oven, a number of composite parts may be placed in the oven to go through the post curing process. Generally, the curing temperature and curing time may vary from one embodiment to the next and, among other things, may depend on the type of epoxy, thickness of epoxy, etc. For example, when the curing temperature increases, the curing time may be shorter.

It should be appreciated that, in some embodiments, the relatively soft core, such as a core including cardboard, paper, etc., may be less prone to buckling than a relatively hard core that may include thermoplastic and/or thermoset materials (e.g., polycarbonate tubes). For example, under comparable loads, the soft core may deform more than the hard core, thereby absorbing more energy than the hard core. Moreover, in an embodiment, composite skins that include randomly oriented discontinuous fibers may be more bendable and/or stretchable than composite skins that include the continuous fibers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, comprising:
   positioning a powder on a molding surface of a first mold portion, the powder including a plurality of granules of one or more of a thermoplastic material or thermoset material;
   positioning a resin impregnated fiber sheet on the powder;
   positioning a partial stack assembly on the resin impregnated fiber sheet, the partial stack assembly including a core blank and another fiber sheet impregnated with resin in contact with the core blank, the core blank being positioned on the resin impregnated fiber sheet, and the core blank includes a plurality of tubular members bonded together; and
   compressing and heating the powder together with the resin impregnated fiber sheet and the partial stack assembly in the compression mold to form a composite sandwich and bond together the plurality of granules to form a substantially solid and monolithic outer layer of the composite sandwich having an outer surface substantially free of defects.

2. The method of claim 1 wherein the first mold portion and a second mold portion define a mold cavity, the powder and the resin impregnated fiber sheet are positioned in the mold cavity, and the method further comprising removing gasses from the resin impregnated fiber sheet.

3. The method of claim 2 wherein removing gasses from the resin impregnated fiber sheet includes removing gases from the mold cavity.

4. The method of claim 3 wherein removing gases from the mold cavity includes vacuuming the mold cavity.

5. The method of claim 1, further comprising electrostatically charging the molding surface to electrostatically attract at least some of the powder to the molding surface.

6. The method of claim 1 wherein the powder has a higher glass transition temperature than the resin in the resin impregnated fiber sheet.

7. The method of claim 1, where compressing includes applying a pressure from about 5 bars to about 10 bars to the first mold portion and the second mold portion.

8. The method of claim 1 wherein the size of the powder ranges from about 10 μm to about 100 μm.

9. A method, comprising:
   positioning a powder on a molding surface of a first mold portion, the powder including a plurality of granules of one or more of a thermoplastic material or thermoset material;
   electrostatically charging the molding surface to electrostatically attract at least some of the powder to the molding surface;
   positioning a resin impregnated fiber sheet on the powder;
   positioning a partial stack assembly on the resin impregnated fiber sheet, the partial stack assembly including a core blank and another fiber sheet impregnated with resin in contact with the core blank, and the core blank being positioned on the resin impregnated fiber sheet; and
   compressing and heating the powder together with the resin impregnated fiber sheet and the partial stack assembly in the compression mold to form a composite sandwich and bond together the plurality of granules to form a substantially solid and monolithic outer layer of the composite sandwich having an outer surface substantially free of defects.

10. The method of claim 9 wherein the first mold portion and a second mold portion define a mold cavity, the powder and the resin impregnated fiber sheet are positioned in the mold cavity, and the method further comprising removing gasses from the resin impregnated fiber sheet.

11. The method of claim 10 wherein removing gasses from the resin impregnated fiber sheet includes removing gases from the mold cavity.

12. The method of claim 11 wherein removing gases from the mold cavity includes vacuuming the mold cavity.

13. The method of claim 9 wherein the powder has a higher glass transition temperature than the resin in the resin impregnated fiber sheet.

14. The method of claim 9 wherein the core blank includes a plurality of cells each having one or more walls including one or more of a cardboard, paper, or foam.

15. The method of claim 9 where compressing includes applying a pressure from about 5 bars to about 10 bars to the first mold portion and the second mold portion.

16. The method of claim 9 wherein the size of the powder ranges from about 10 μm to about 100 μm.

17. A method, comprising:
   positioning a powder on a molding surface of a first mold portion, the powder including a plurality of granules of one or more of a thermoplastic material or thermoset material;
   positioning a resin impregnated fiber sheet on the powder;
   positioning a partial stack assembly on the resin impregnated fiber sheet, the partial stack assembly including a core blank and another fiber sheet impregnated with resin in contact with the core blank, the core blank being positioned on the resin impregnated fiber sheet, and the core blank includes a plurality of cells each having one or more walls including one or more of a cardboard, paper, or foam; and compressing and heating the powder together with the resin impregnated fiber sheet and the partial stack assembly in the compression mold to form a composite sandwich and bond together the plurality of granules to form a substantially solid and monolithic outer layer of the composite sandwich having an outer surface substantially free of defects.

18. The method of claim 17 wherein the first mold portion and a second mold portion define a mold cavity, the powder and the resin impregnated fiber sheet are positioned in the mold cavity, and the method further comprising removing gasses from the resin impregnated fiber sheet.

19. The method of claim 18 wherein removing gasses from the resin impregnated fiber sheet includes removing gases from the mold cavity.

20. The method of claim 19 wherein removing gases from the mold cavity includes vacuuming the mold cavity.

21. The method of claim 17 wherein the powder has a higher glass transition temperature than the resin in the resin impregnated fiber sheet.

22. The method of claim 17 where compressing includes applying a pressure from about 5 bars to about 10 bars to the first mold portion and the second mold portion.

23. The method of claim 17 wherein the size of the powder ranges from about 10 μm to about 100 μm.

* * * * *